United States Patent
Russell

(10) Patent No.: US 10,585,908 B2
(45) Date of Patent: Mar. 10, 2020

(54) METHOD AND SYSTEM FOR PARAMETERIZING LOG FILE LOCATION ASSIGNMENTS FOR A LOG ANALYTICS SYSTEM

(71) Applicant: ORACLE INTERNATIONAL CORPORATION, Redwood Shores, CA (US)

(72) Inventor: Jerry Paul Russell, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 695 days.

(21) Appl. No.: 15/089,005

(22) Filed: Apr. 1, 2016

(65) Prior Publication Data

US 2016/0292166 A1    Oct. 6, 2016

Related U.S. Application Data

(60) Provisional application No. 62/142,987, filed on Apr. 3, 2015.

(51) Int. Cl.
*G06F 16/00* (2019.01)
*G06F 16/248* (2019.01)
(Continued)

(52) U.S. Cl.
CPC ........ *G06F 16/248* (2019.01); *G06F 3/04842* (2013.01); *G06F 9/44505* (2013.01); *G06F 9/542* (2013.01); *G06F 11/00* (2013.01); *G06F 11/0766* (2013.01); *G06F 11/0775* (2013.01); *G06F 11/3006* (2013.01); *G06F 11/3072* (2013.01); *G06F 11/3086* (2013.01); *G06F 16/21* (2019.01); *G06F 16/2228* (2019.01); *G06F 16/2455* (2019.01);
(Continued)

(58) Field of Classification Search
CPC combination set(s) only.
See application file for complete search history.

(56) References Cited

U.S. PATENT DOCUMENTS 5,832,511 A * 11/1998 Beck ..................... G06F 8/71
6,738,911 B2    5/2004 Hayes
(Continued)

FOREIGN PATENT DOCUMENTS

CN    101267352 B    5/2011

OTHER PUBLICATIONS

Li, Weixi "Automatic Log Analysis Using Machine Learning: Awesome Automatic Log Analysis Version 2.0", Uppsala Universitet, Nov. 2013. (Year: 2013).
(Continued)

*Primary Examiner* — Taelor Kim
*Assistant Examiner* — Lahcen Ennaji
(74) *Attorney, Agent, or Firm* — Invoke

(57) ABSTRACT

Disclosed is a system, method, and computer program product for implementing a log analytics method and system that can configure, collect, and analyze log records in an efficient manner. The log analytics system, method, and computer program product provide target-based configuration of log monitoring metadata. Variable pathnames (e.g., having variables instead of absolute pathnames) may be specified to identify a directory that contains log files to monitor.

21 Claims, 20 Drawing Sheets

(51) Int. Cl.
| | |
|---|---|
| *G06F 16/84* | (2019.01) |
| *G06F 16/35* | (2019.01) |
| *G06F 16/2455* | (2019.01) |
| *G06F 16/22* | (2019.01) |
| *G06N 20/00* | (2019.01) |
| *H04L 12/24* | (2006.01) |
| *G06F 11/00* | (2006.01) |
| *G06F 16/21* | (2019.01) |
| *G06F 11/07* | (2006.01) |
| *G06F 11/30* | (2006.01) |
| *H04L 12/26* | (2006.01) |
| *G06F 17/22* | (2006.01) |
| *G06F 17/27* | (2006.01) |
| *G06F 9/445* | (2018.01) |
| *G06F 9/54* | (2006.01) |
| *G06F 3/0484* | (2013.01) |

(52) U.S. Cl.
CPC .......... *G06F 16/353* (2019.01); *G06F 16/84* (2019.01); *G06F 17/2282* (2013.01); *G06F 17/2705* (2013.01); *G06N 20/00* (2019.01); *H04L 41/5074* (2013.01); *H04L 43/04* (2013.01); *H04L 41/145* (2013.01)

(56) References Cited

U.S. PATENT DOCUMENTS

| | | |
|---|---|---|
| 6,910,183 B2 | 6/2005 | Maier et al. |
| 7,111,075 B2 | 9/2006 | Pankovcin et al. |
| 7,155,514 B1 | 12/2006 | Milford |
| 7,523,433 B1 | 4/2009 | Anderson |
| 7,653,633 B2 | 1/2010 | Villella et al. |
| 7,822,850 B1 | 10/2010 | Brikman et al. |
| 7,844,999 B1 | 11/2010 | Aguilar-macias et al. |
| 8,041,683 B1 * | 10/2011 | Korolev .............. H04L 67/1097 707/672 |
| 8,612,377 B2 | 12/2013 | Beg et al. |
| 8,620,928 B1 | 12/2013 | Walton |
| 8,832,125 B2 | 9/2014 | Boctor |
| 9,092,625 B1 | 7/2015 | Kashyap et al. |
| 9,262,519 B1 | 2/2016 | Saurabh et al. |
| 9,292,328 B2 | 3/2016 | Pratt et al. |
| 2004/0254919 A1 | 12/2004 | Giuseppini |
| 2005/0044075 A1 * | 2/2005 | Steere ............... G06F 17/30067 |
| 2005/0228885 A1 | 10/2005 | Winfield et al. |
| 2006/0136177 A1 | 6/2006 | Patanian |
| 2006/0195297 A1 | 8/2006 | Kubota et al. |
| 2006/0214963 A1 | 9/2006 | Komatsu |
| 2008/0005265 A1 | 1/2008 | Miettinen et al. |
| 2008/0155103 A1 | 6/2008 | Bailey |
| 2009/0089252 A1 | 4/2009 | Galitsky et al. |
| 2009/0119307 A1 | 5/2009 | Braun et al. |
| 2009/0249250 A1 | 10/2009 | Gajula et al. |
| 2010/0115010 A1 | 5/2010 | Anderson et al. |
| 2011/0246826 A1 | 10/2011 | Hsieh et al. |
| 2012/0005542 A1 | 1/2012 | Petersen et al. |
| 2012/0117079 A1 | 5/2012 | Baum et al. |
| 2012/0124047 A1 | 5/2012 | Hubbard |
| 2012/0278872 A1 * | 11/2012 | Woelfel .............. H04L 61/2596 726/7 |
| 2013/0054402 A1 | 2/2013 | Asherman et al. |
| 2013/0227352 A1 * | 8/2013 | Kumarasamy ...... G06F 11/3072 714/47.1 |
| 2013/0282739 A1 | 10/2013 | Anderson et al. |
| 2014/0089744 A1 | 3/2014 | Oshiro |
| 2014/0157370 A1 | 6/2014 | Plattner et al. |
| 2014/0289428 A1 | 9/2014 | Walter et al. |
| 2014/0304197 A1 | 10/2014 | Jaiswal et al. |
| 2015/0149480 A1 | 5/2015 | Swan et al. |
| 2015/0154192 A1 | 6/2015 | Lysne et al. |
| 2015/0379052 A1 | 12/2015 | Agarwal et al. |
| 2016/0019286 A1 * | 1/2016 | Bach .................. G06F 8/10 707/603 |
| 2016/0034510 A1 | 2/2016 | Gukal |
| 2016/0041894 A1 | 2/2016 | Reid et al. |
| 2016/0092558 A1 | 3/2016 | Ago et al. |
| 2016/0224570 A1 | 8/2016 | Sharp et al. |
| 2016/0246849 A1 | 8/2016 | Frampton et al. |
| 2016/0247205 A1 | 8/2016 | Ziliacus et al. |
| 2016/0253425 A1 | 9/2016 | Stoops et al. |
| 2016/0292263 A1 | 10/2016 | Ferrar |
| 2016/0292592 A1 | 10/2016 | Patthak et al. |

OTHER PUBLICATIONS

School of Haskell, "Parsing Log FIles in Haskell", Feb. 1, 2015, 22 pages.
Loggly, "Automated Parsing Log Types", Support Center, Apr. 8, 2015, 15 pages https://www.loggly.com/docs/automated-parsing/.
"Log monitoring/analysis" May 13, 2014, 4 pages http://ossec-docs.readthedocs.org/en/latest/manual/monitoring/.
Scalyr, "Parsing Logs", Apr. 19, 2015, 9 pages https://www.scalyr.com/help/parsing-logs/.
DataDOG DOCS, "Log Parsing in the Agent", Jul. 20, 2013, 3 pages http://docs.datadoghq.com/guides/logs/.
Gamuts Software, "Log File Parsers", Mar. 5, 2015, 1 page http://www.gamutsoftware.com/index.php/help/logfileconfiguration/.
Logentries, "Tags and Alerts", Jul. 6, 2015, 5 pages https://logentries.com/doc/setup-tags-alerts/.
William Lam, "How to Add a Tag (Log prefix) to Syslog Entries", May 7, 2013, 4 pages.
Loggly, "Tags", Support Center, Apr. 30, 2015, 5 pages hlips://www.loggly.com/docs/tags/.
Loggly, "Tag Your Sources for More Focused Searching" Sep. 26, 2015, 5 pages https://www.loggly.com/blog/log-management-tags-searching/.
International Search Report and Written Opinion dated Jul. 7, 2016 for corresponding PCT Patent Application No. PCT/US2016/025739.
Wei Xu, et al., "Detecting large-scale system problems by mining console logs", Proceedings of the ACM SIGOPS 22nd Symposium on Operation Systems Principles, SOSP '09, Jan. 1, 2009, p. 117, XP055254995, New York, New York, USA.
Meiyappan Nagappan, et al., "Abstracting software system logs", Mining Software log lines to log event types for mining Repositories (MSR), 2010, on, IEEE, Piscataway, NJ, USA, 7th IEEE Working Conference May 2, 2010, pp. 114-117, XP031675571.
Hongyong Yu, et al., "Mass log data processing and mining based on Hadoop and cloud computing" Computer Science & Education (ICCSE), 2010, 7th International Conference On, IEEE, Jul. 14, 2012, pp. 197-202, XP032232566.
T. G. Dietterich ("Ensemble methods in machine learning", in Multiple Classifier System, Springer, pp., 1-15, 2000) (Year: 2000).
Ning et al ("HLAer: a System for Heterogeneous Log Analysis", "HLAer: a System for Heterogeneous Log Analysis," in SDM Workshop on Heterogeneous Machine Learning, 2014, pp. 1-22) (Year: 2014).
Han et al("Centroid-Based Document Classification: Analysis and Experimental Results", In: Zighed D.A., Komorowski J., Zytkow J. (eds) Principles of Data Mining and Knowledge Discovery. PKDD 2000. Lecture Notes in Computer Science, vol. 1910. Springer, 2000, pp. 1-8) (Year:200).
Cohn et al., "Audio De-identification: A New Entity Recognition Task," NAACL-HLT, 2019, 8 pages.
Cumby et al., "A Machine Learning Based System for Semi-Automatically Redacting Documents," Proceedings of the Twenty-Third Innovative Applications of Artificial Intelligence Conference, 2011, pp. 1628-1635.
Demoncourt et al., "De-identification of patient notes with recurrent neural networks," Journal of the American Medical Informatics Association, JAMIA, vol. 24, No. 3, 2016, pp. 596-606.
F1 score, Wikipedia, https://en.wikipedia.org/wiki/F1 score, retrieved on Aug. 2, 2018.
Hayta et al ("Language Identification Based on N-Gram Feature Extraction Method by Using Classifiers", IU-JEEE vol. 13(2), 2013, pp. 1-10) (Year: 2013).

(56) References Cited

OTHER PUBLICATIONS

Irmak et al., "A Scalable Machine-Learning Approach for Semi-Structured Named Entity Recognition," WWW '10 Proceedings of the 19th international conference on World wide web, Apr. 26-30, 2010, pp. 461-470.

Liu et al., "De-identification of clinical notes via recurrent neural network and conditional random field," Journal of Biomedical Informatics, vol. 75, 2017, pp. S34-S42.

Malmasi et al ("NLI Shared Task 2013: MQ Submission", Proceedings of the Eighth Workshop on Innovative Use of NLP for Building Educational Applications, pp. 124-133, Atlanta, Georgia, Jun. 13, 2013) (Year: 2013).

Mamou et al., "Term Set Expansion based NLP Architect by Intel AI Lab," Proceedings of the 2018 Conference on Empirical Methods in Natural Language Processing (System Demonstrations), 2018, pp. 19-24.

Marco Lui ("Generalized Language Identification", PHD Thesis, Department of Computing and Information Systems, The University of Melbourne, Jul. 2014, pp. 1-326.

Ning et al ("HLAer: a System for Heterogeneous Log Analysis", "HLAer: a System for Heterogeneous Log Analysis," ir SDM Workshop on Heterogeneous Machine Learning, 2014, pp. 1-22) (Year: 2014).

Qiu et al., "Learning Word Representation Considering Proximity and Ambiguity," AAAI'14 Proceedings of the Twenty-Eighth AAAI Conference on Artificial Intelligence, 2014, pp. 1572-1578.

Sahlgren et al., "Learning Representations for Detecting Abusive Language," Proceedings of the Second Workshop on Abusive Language Online (ALW2), 2018, pp. 115-123.

Shin et al., "Electronic Medical Records privacy preservation through k-anonymity clustering method," The 6th International Conference on Soft Computing and Intelligent Systems, and the 13th International Symposium on Advanced Intelligence Systems, 2012, 1119-1124.

Tf-idf, Wikipedia, https://en.wikipedia.org/wiki/Tf-idf, retrieved on Aug. 9, 2018.

Trevino, Introduction to K-means Clustering, https://www.datascience.com/blog/k-means-clustering, Jun. 12, 2016.

Yarowsky algorithm, Wikipedia, https://en.wikipedia.org/wik/Yarowsky_algorithm, retrieved on Sep. 12, 2018.

\* cited by examiner

```xml
<?xml version="1.0" encoding="UTF-8" standalone="yes"?>
<LogMonitoring xmlns="http://www.oracle.com/DataCenter/LogAnalyticsStd">
  <VN>V2</VN>
  <CV>1070</CV>
  <BaseParsers>
    <BaseParser id="XYZ_ID1" singleLineOnly="true" type="0" encoding="UTF-8">
      <Name>host_syslog_logtype</Name>
    </BaseParser>
  </BaseParsers>
  <LogRules>
    <LogRule id="XYZ_ID2" name="XYZSyslogSource" sourceType="os_file">
      <TargetName>XYZ_ID3.us.oracle.com</TargetName>
      <TargetType>host</TargetType>
      <TargetGUID>XYZ_ID4</TargetGUID>
      <Sources>
        <Source referenceID="XYZ_ID5">
          <Patterns>
            <Pattern id="XYZ_ID6" name="/var/log/messages*" include="true">
              <ParserRef id="XYZ_ID1" priority="1"/>
            </Pattern>
          </Patterns>
        </Source>
      </Sources>
    </LogRule>
  </LogRules>
</LogMonitoring>
```

1003 → `<CV>1070</CV>`
1001 → `<FieldDef name="service" DataType="STRING" MaxSize="4000"/>`
1002 → `<LogSource id="XZY_ID10" name="LinuxSyslogSource" sourceType="os_file"/>`
1004 → `<BaseParser id="XYZ_ID11" singleLineOnly="true" type="0" locale="en_US" encoding="UTF-8">`
`<Name>host_syslog_logtype</Name>`
`<Regex>(\S+)\s+(\d+)\s(\d+):(\d+):(\d+)\s(\S+)\s(?:[^:\[]+)(?:\[(\d+)\])?:\s+)?(.+)</Regex>`
`<BaseFields>`
1006 → {
`<BaseField seq="1" name="timemonthshortname"/>`
`<BaseField seq="2" name="timeday"/>`
`<BaseField seq="3" name="timehour24"/>`
`<BaseField seq="4" name="timeminute"/>`
`<BaseField seq="5" name="timesecond"/>`
`<BaseField seq="6" name="srvhostname"/>`
`<BaseField seq="7" name="service"/>`
`<BaseField seq="8" name="ospid"/>`
`<BaseField seq="9" name="msg"/>`
}
`</BaseFields>`
`</BaseParser>`

Fig. 10

Jun 15 23:48:12 hosta sudo: Deprecated pam_stack module called from service "sudo"
Jun 16 06:48:54 hosta sshd[17557]: Accepted publickey for scmadm from xxx.xxx.1.1 port xyz ssh2
Jun 16 06:48:54 hostb sshd[17557]: pam_unix(sshd:session): session opened for user userx by (uid=0)

METHOD AND SYSTEM FOR PARAMETERIZING LOG FILE LOCATION ASSIGNMENTS FOR A LOG ANALYTICS SYSTEM

CROSS-REFERENCE TO RELATED APPLICATIONS

The present application claims the benefit of priority to U.S. Provisional Application No. 62/142,987, filed on Apr. 3, 2015, which is hereby incorporated by reference in its entirety. The present application is related to (a) U.S. Ser. No. 15/088,943, entitled "METHOD AND SYSTEM FOR IMPLEMENTING TARGET MODEL CONFIGURATION METADATA FOR A LOG ANALYTICS SYSTEM", (b) U.S. Ser. No. 15/089,049, entitled "METHOD AND SYSTEM FOR IMPLEMENTING AN OPERATING SYSTEM HOOK IN A LOG ANALYTICS SYSTEM", (c) U.S. Ser. No. 15/089,129, entitled "METHOD AND SYSTEM FOR IMPLEMENTING COLLECTION-WISE PROCESSING IN A LOG ANALYTICS SYSTEM", (d) U.S. Ser. No. 15/089,180, entitled "METHOD AND SYSTEM FOR IMPLEMENTING A LOG PARSER IN A LOG ANALYTICS SYSTEM", (e) U.S. Ser. No. 15/089,226, entitled "METHOD AND SYSTEM FOR IMPLEMENTING MACHINE LEARNING CLASSIFICATIONS", all filed on even date herewith, and which are all hereby incorporated by reference in their entirety.

BACKGROUND AND SUMMARY

Many types of computing systems and applications generate vast amounts of data pertaining to or resulting from the operation of that computing system or application. These vast amounts of data are stored into collected locations, such as log files/records, which can then be reviewed at a later time period if there is a need to analyze the behavior or operation of the system or application.

Server administrators and application administrators can benefit by learning about and analyzing the contents of the system log records. However, it can be a very challenging task to collect and analyze these records. There are many reasons for these challenges.

One significant issue pertains to the fact that many modern organizations possess a very large number of computing systems, each having numerous applications that run on those computing systems. It can be very difficult in a large system to configure, collect, and analyze log records given the large number of disparate systems and applications that run on those computing devices. Furthermore, some of those applications may actually run on and across multiple computing systems, making the task of coordinating log configuration and collection even more problematic.

Conventional log analytics tools provide rudimentary abilities to collect and analyze log records. However, conventional systems cannot efficiently scale when posed with the problem of massive systems involving large numbers of computing systems having large numbers of applications running on those systems. This is because conventional systems often work on a per-host basis, where set-up and configuration activities need to be performed each and every time a new host is added or newly configured in the system, or even where new log collection/configuration activities need to be performed for existing hosts. This approach is highly inefficient given the extensive number of hosts that exist in modern systems. Furthermore, the conventional approaches, particularly on-premise solutions, also fail to adequately permit sharing of resources and analysis components. This causes significant and excessive amounts of redundant processing and resource usage.

Therefore, there is a need for an improved approach to implement a log analytics system.

Embodiments of the present invention provide an approach for implementing a log analytics method and system that can configure, collect, and analyze log records in an efficient manner. In some embodiments, the log analytics system and method provide target-based configuration of log monitoring metadata. In certain embodiments, the log analytics system and method is implemented in a cloud-based/SaaS-based architecture. Variable pathnames (e.g., having variables instead of absolute pathnames) may be specified to identify a directory that contains log files to monitor.

Other additional objects, features, and advantages of the invention are described in the detailed description, figures, and claims.

BRIEF DESCRIPTION OF FIGURES

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention.

FIG. 9 illustrates example XML configuration content according to some embodiments of the invention.

FIG. 10 illustrates server-side information to be included in the configuration file to facilitate the log parsing.

FIG. 13 illustrates extraction of additional data that is not consistent across all log entries.

DETAILED DESCRIPTION

As noted above, many types of computing systems and applications generate vast amounts of data pertaining or resulting from operation of that computing system or application. These vast amounts of data are then stored into collected locations, such as log files/records, which can be reviewed at a later time period if there is a need to analyze the behavior or operation of the system or application. Embodiments of the present invention provide an approach for collecting and analyzing these sets of data in an efficient manner. While the below description may describe the invention by way of illustration with respect to "log" data, the invention is not limited in its scope only to the analysis of log data, and indeed is applicable to wide range of data types. Therefore, the invention is not to be limited in its application only to log data unless specifically claimed as such. In addition, the following description may also interchangeably refer to the data being processed as "records" or "messages", without intent to limit the scope of the invention to any particular format for the data.

Some embodiments of the invention are directed to a method and system for implementing high volume log collection and analytics. The known art is not scalable for massive and diverse logs, and often requires staging of entire datasets. The known approach to log collection/analytics also does not provide an efficient way to handle streaming log data. In contrast, some embodiments provide an architecture having a combination of components that can handle collection and analysis of a massive amount of log data, particularly in a cloud-based and/or SaaS-based platform. The architecture includes portions at the customer location to efficiently collect log data from customer servers, and to then process the collected data within a pipeline at a cloud-based server. This permits, for example, multiple versions of each service to support parallel processing specific to particular stages.

Figure 1A:
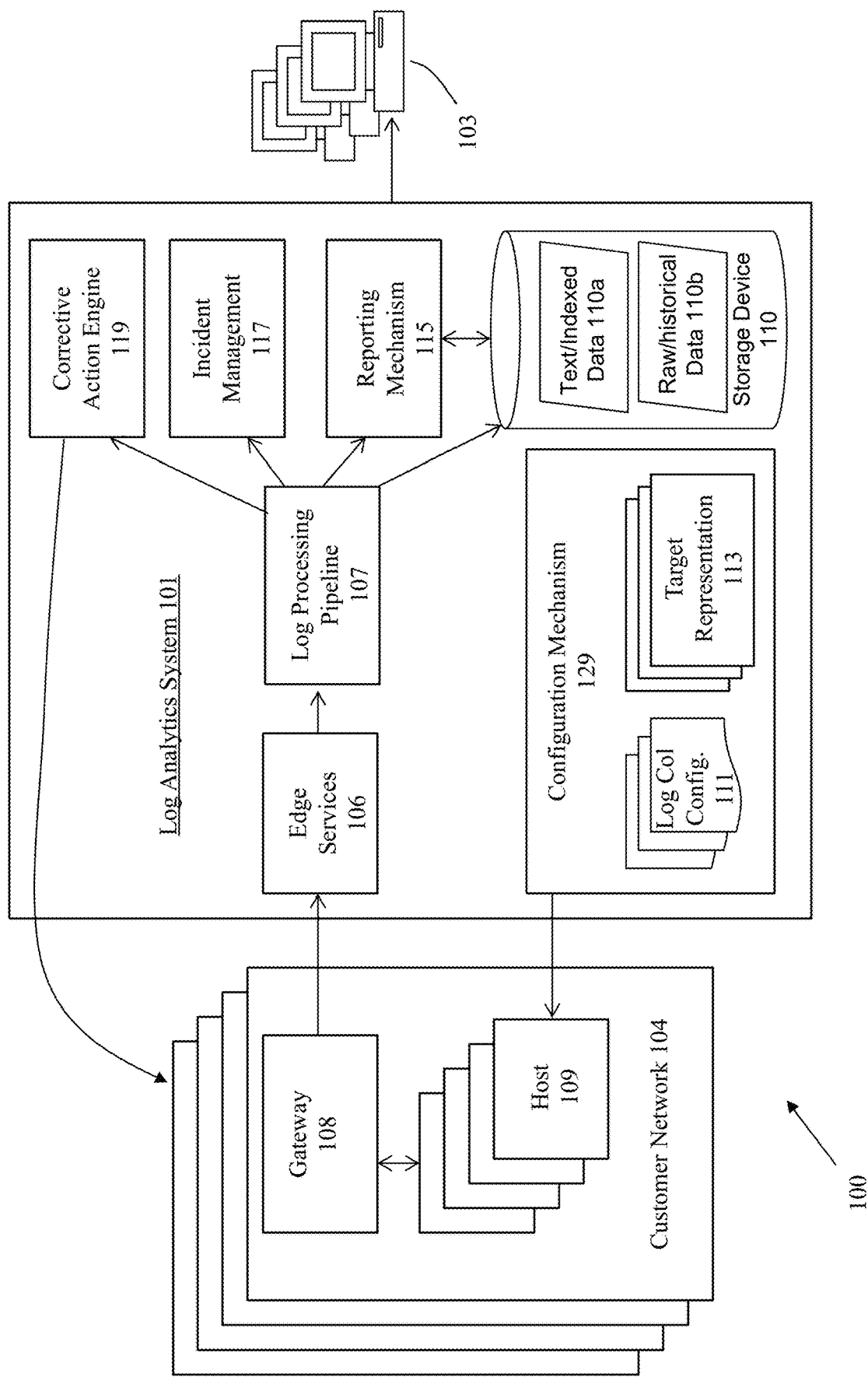
FIG. 1A illustrates an example system which may be employed in some embodiments of the invention.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, e.g., where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
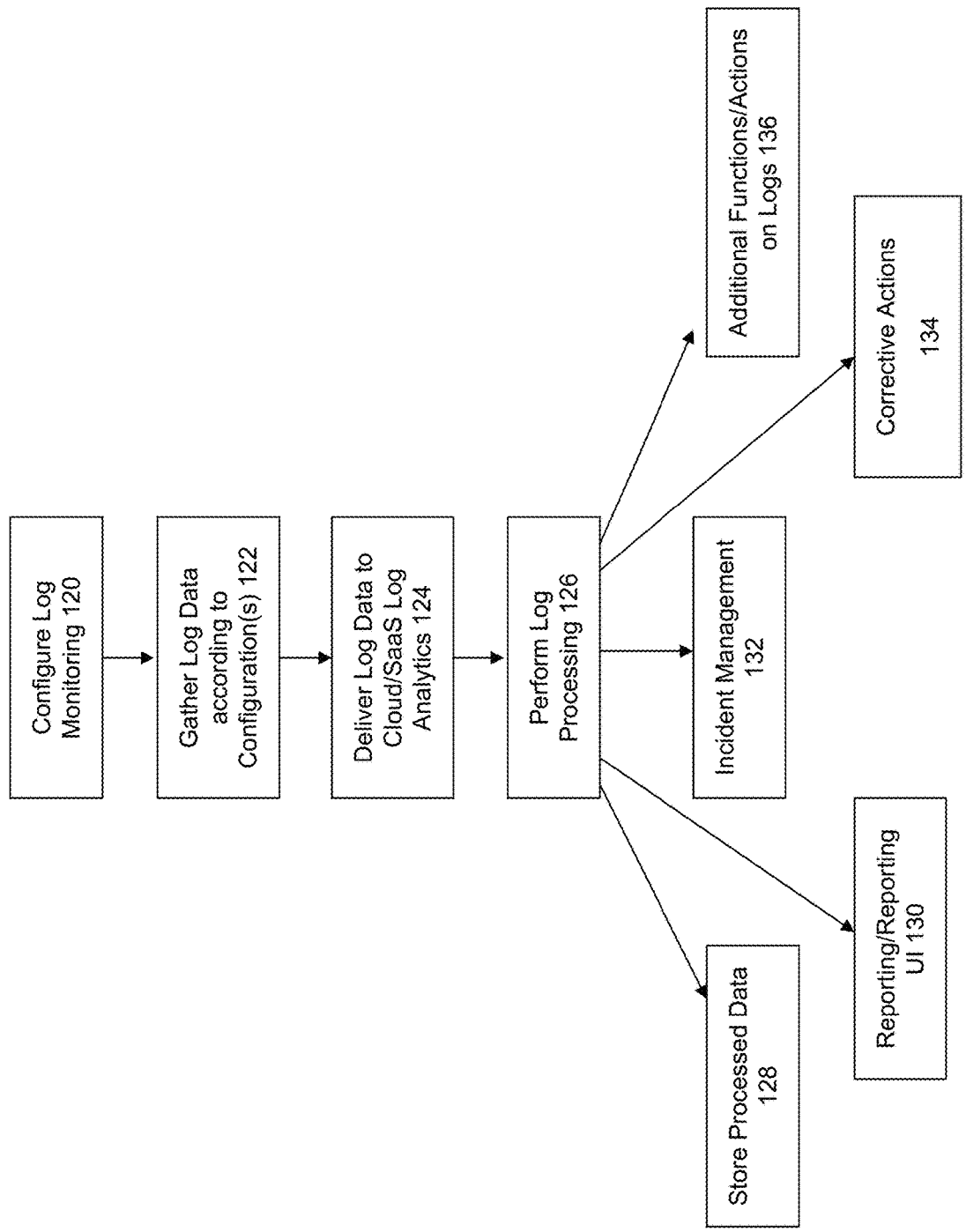
FIG. 1B illustrates a flowchart of a method which may be employed in some embodiments of the invention.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

As discussed in more detail below, the log collection configuration 111 comprise the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which are associated with one or more logs one or more hosts.

The ability of the current embodiment to configure log collection/monitoring by associating targets with log rules and/or log sources provides unique advantages for the invention. This is because the user that configures log monitoring does not need to specifically understand exactly how the logs for a given application are located or distributed across the different hosts and components within the environment. Instead, the user only needs to select the specific target (e.g., application) for which monitoring is to be performed, and to then configure the specific parameters under which the log collection process is to be performed.

This solves the significant issue with conventional systems that require configuration of log monitoring on a per-host basis, where set-up and configuration activities need to be performed each and every time a new host is added or newly configured in the system, or even where new log collection/configuration activities need to be performed for existing hosts. Unlike conventional approaches, the log analytics user can be insulated from the specifics of the exact hosts/components that pertain to the logs for a given target. This information can be encapsulated in underlying metadata that is maintained by administrators of the system that understand the correspondence between the applications, hosts, and components in the system.

The next action at 122 is to capture the log data according to the user configurations. The association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks and places the data into an inbound data store for further processing by a log processing pipeline 107.

At 126, the log processing pipeline 107 performs a series of data processing and analytical operations upon the collected log data, which is described in more detail below. At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

Figure 2:
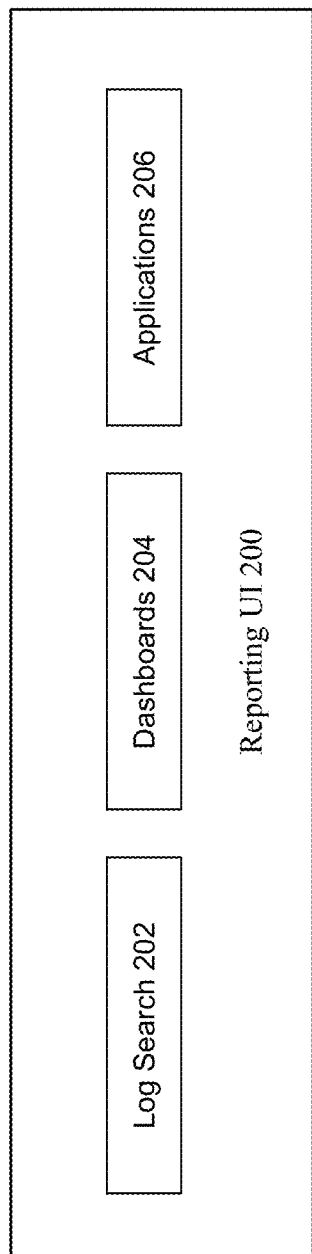
FIG. 2 illustrates a reporting UI.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
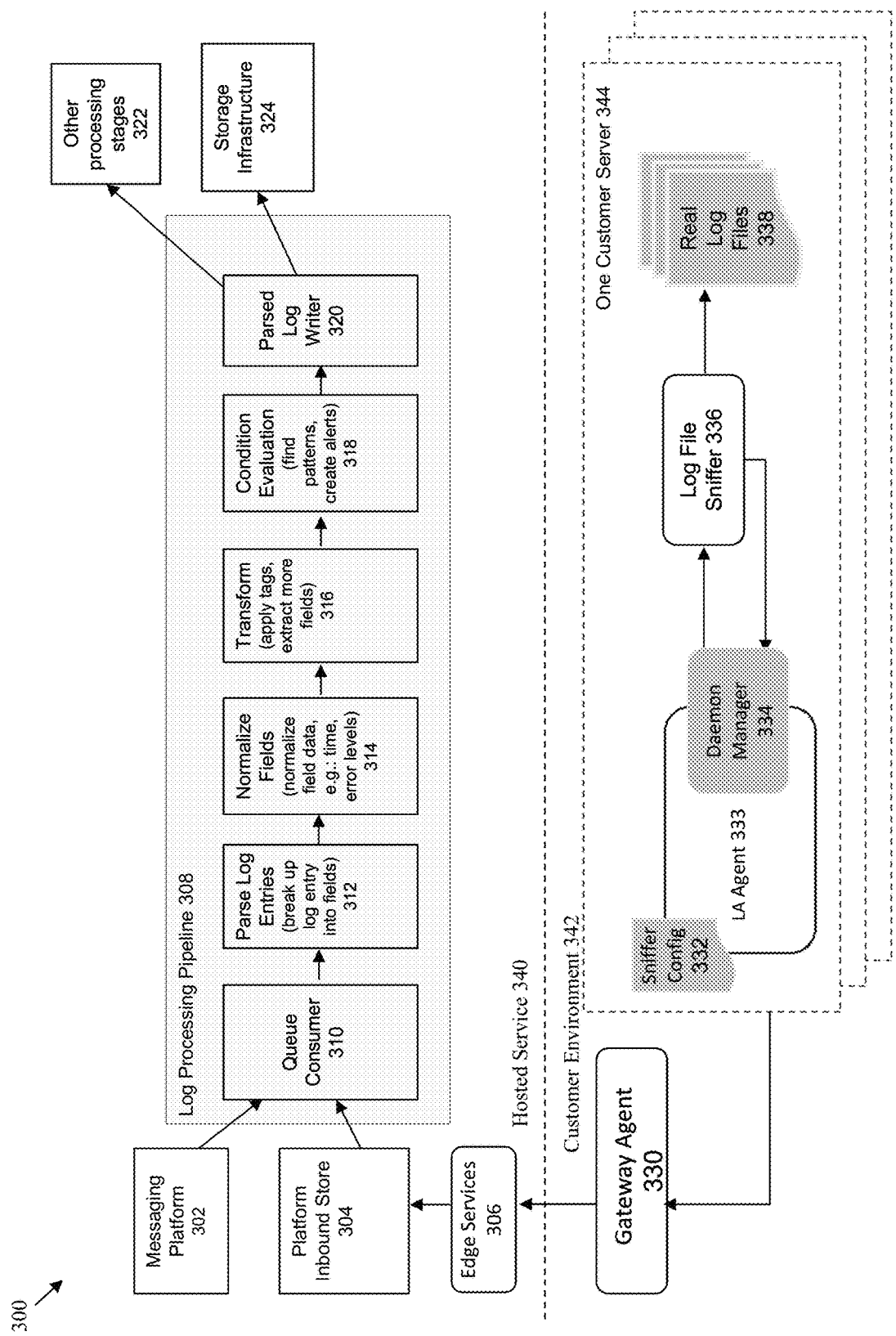
FIGS. 3A-C provide more detailed illustrations of the internal structure of the log analytics system and the components within the customer environment that interact with the log analytics system.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338. A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data is immediately stored into an inbound data storage device 304 (the "platform inbound store"). This acts as a queue for the log processing pipeline 308. A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields. As discussed in more detail below, the "log type" configured for the log specifies how to break up the log entry into the desired fields.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case unabbreviated term "error").

The "transform" stage 316 can be used to synthesize new content from the log data. As an example and which will be discussed in more detail below, "tags" can be added to the log data to provide additional information about the log entries. As another example, field extraction can be performed to extract additional fields from the existing log entry fields.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism.

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
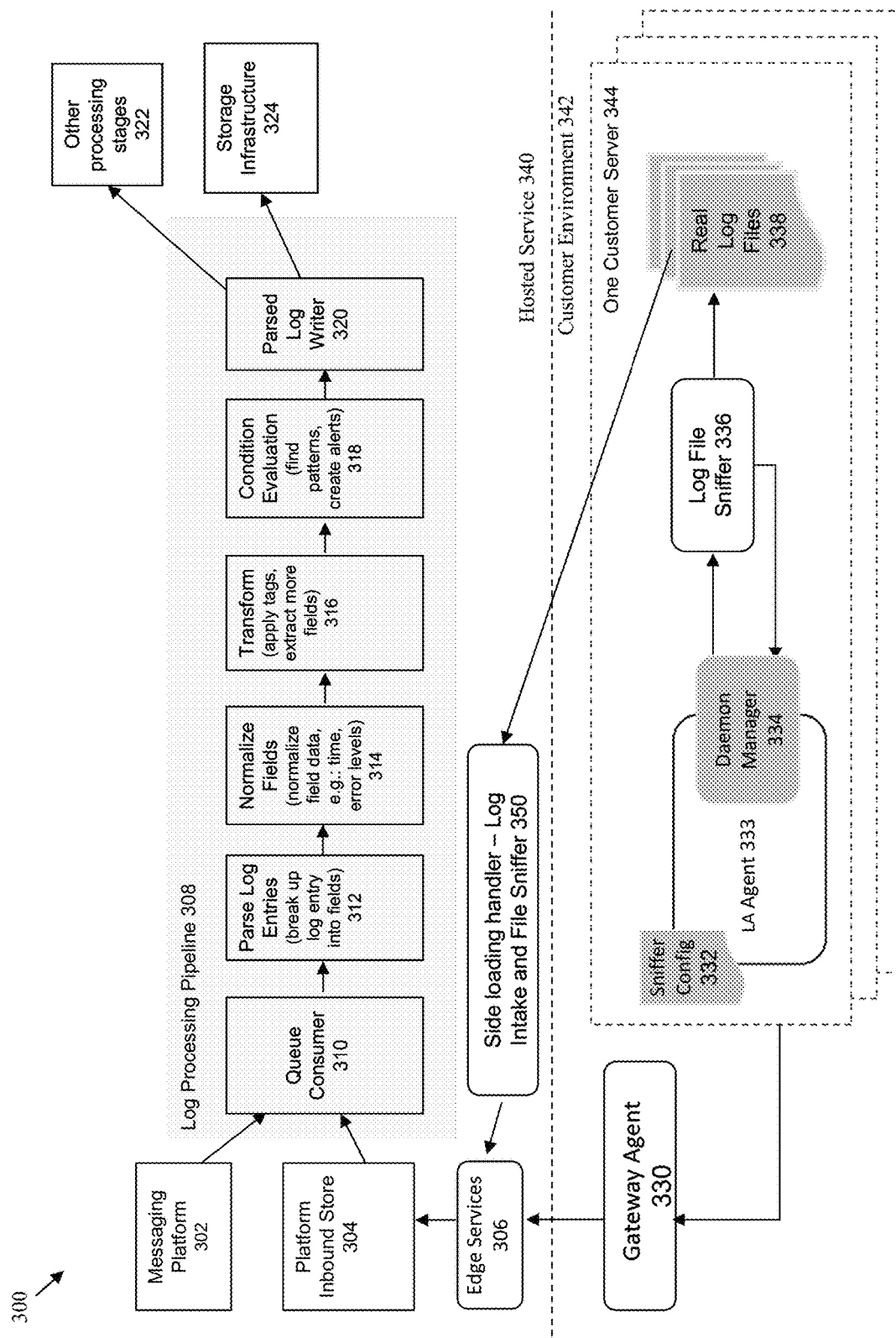
Figure 3C:
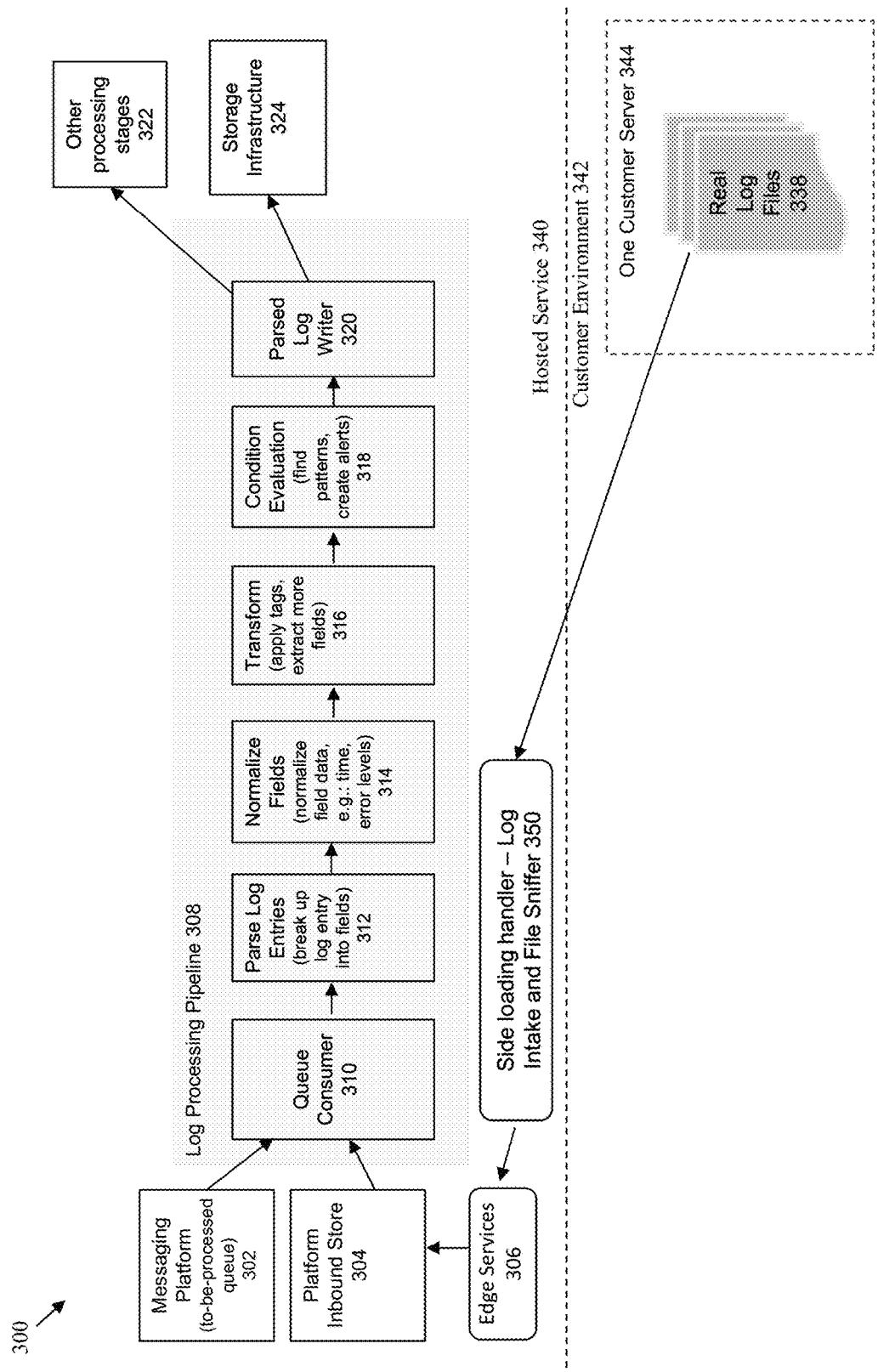

As shown in FIG. 3B, some embodiments provide a side loading mechanism 350 to collect log data without to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

Figure 4A:
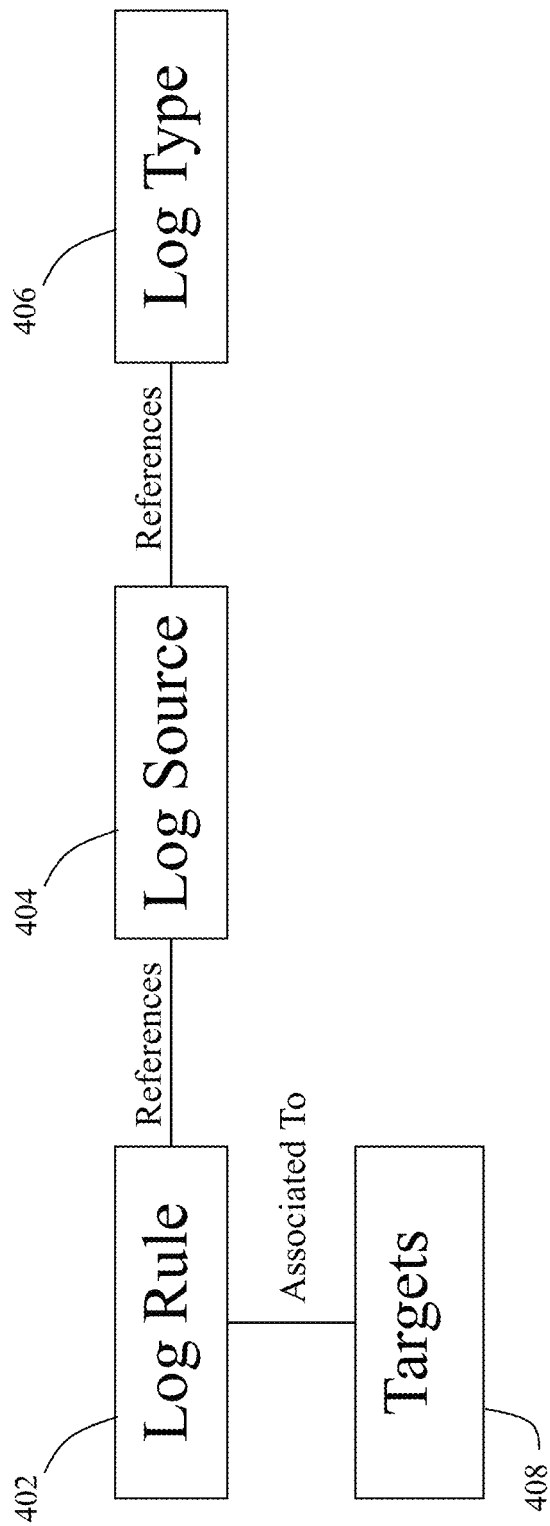
FIGS. 4A-C illustrate approaches to implement the log collection configuration.
Figure 4B:
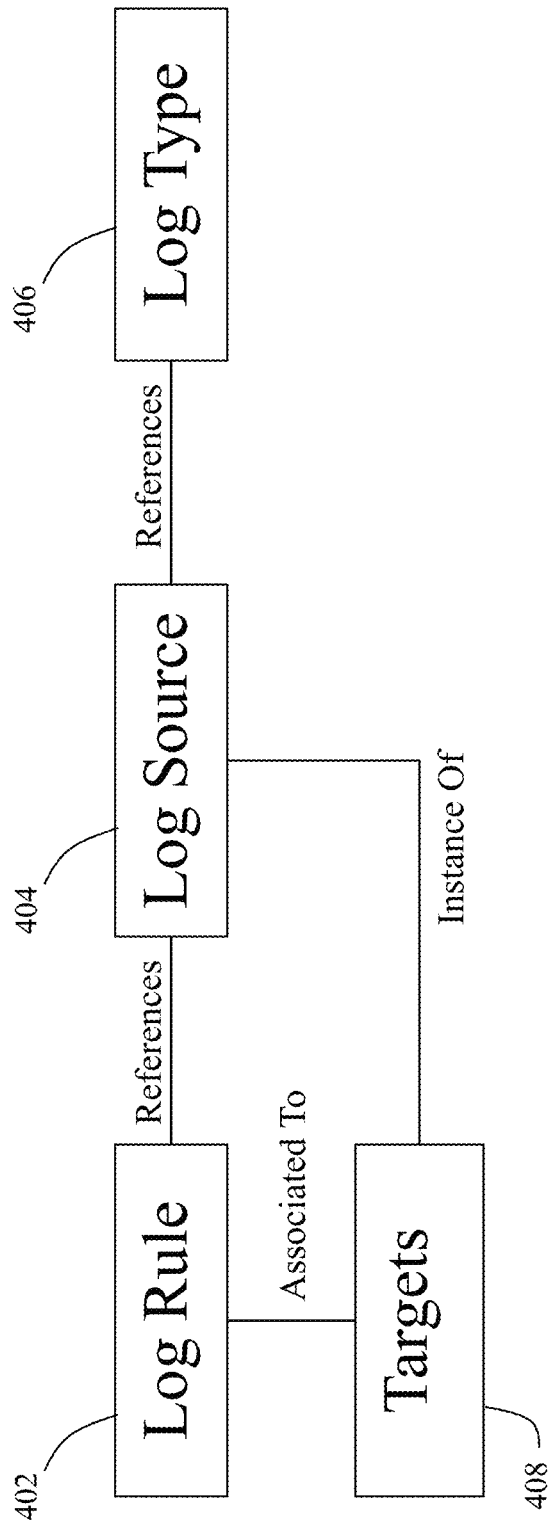

FIGS. 4A-B illustrate approaches to implement the log collection configuration. This approach allow for very large scale configuration of how to monitor log files having one or more log entries. In some embodiments, a log entry corresponds to a single logical row from a log file. In the actual log file, a single entry could take multiple lines due to carriage returns being part of the log entry content. This entire content is considered a single "entry". Each entry starts with "####<date" and could occupy a single physical line in the file or multiple lines separate by carriage returns.

In this model the "Log Type" 406 defines how the system reads the log file, as well as how to decompose the log file into its parts. In some embodiments, a log file contains several base fields. The base fields that exist may vary for different types of logs. A "base parser" can be used to breaks a log entry into the specified fields. The base parser may also perform transformations. For instance, a Date field can be converted to a normalized format and time adjusted to be in UTC so data from many locations can be mixed together.

The "Log Source" 404 defines where log files are located and how to read them. In some embodiments, the log source is a named definition that contains a list of log files described using patterns, along with the parser that is needed to parse that file. For instance, one source could be "SSH Log files". This source may list each log file related to SSH separately, or could describe the log files using a wildcard (e.g., "/var/log/ssh*"). For each pattern, a base parser can be chosen (e.g., by a user) to parse the base fields from the file. This approach can be used to ensure that for a single pattern that all files conform to the same base parse structure. For one source, one can choose from among multiple log types, and give a priority to those possible types. For example, types A, B, and C can be identified, where the analysis works through each of these in order to determine whether the source matches one of these identified types. Therefore, for each pattern, the user can choose multiple base parsers. In some embodiments, the same source may match against and be analyzed using multiple types.

The "Log Rule" 402 defines a set of sources along with conditions and actions to be triggered during continuous monitoring. The "Targets" 408 identify individual components in an IT environment that contain logs. Associating a rule to a target starts the monitoring process in some embodiments.

Figure 4C:
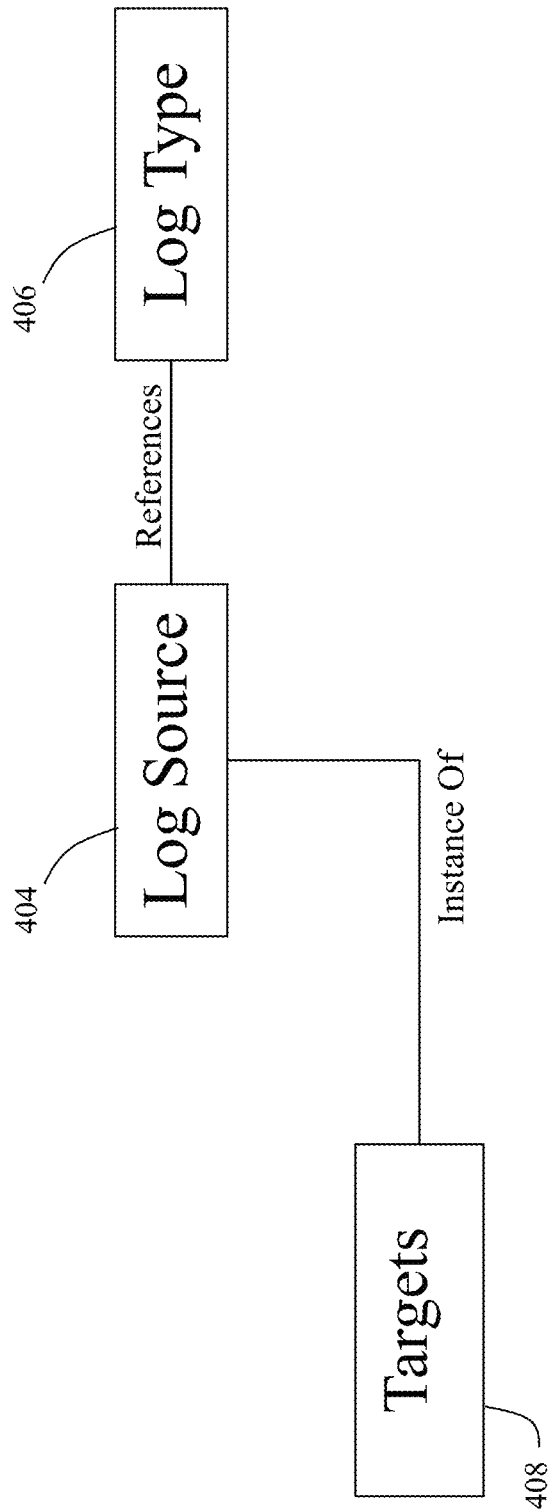

In the embodiment of FIG. 4A, one or more log rules are associated with one or more targets. In the alternative embodiment of FIG. 4B, one or more log sources can be associated with one or more targets to create an instance of a target. In the embodiment of FIG. 4C, log rules are not even provided as an approach to create the associations—where only log source to target associations are provided to create target instances. Each of these approaches are described in more detail below.

Figure 5:
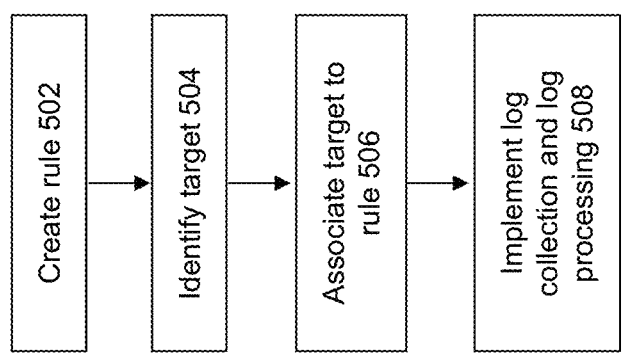
FIG. 5 shows a flowchart of an approach to implement a log collection configuration by associating a log rule with a target.

FIG. 5 shows a flowchart of an approach to implement a log collection configuration by associating a log rule with a target. At 502, one or more log rules are created. The rules are processed by a rules engine within the log processing system to implement rule-based handling of a given target. Therefore, the rule will include specific logic for handling a given target that it is associated with.

In some embodiments, the rule can be used to specific a target type, which identifies the type of the target that the rule is intended to address. A rule can be specified for a single target type or multiple target types. For example, when monitoring a log file for a database instance, the target type can be set to Database Instance so that reporting of activities in the log goes against the proper target type; In some embodiments, even though the rule may be configured for a "File" as a log type, the target type can still be any managed target type, such as a database.

The rule may specify a source type, which identifies the type of log file that the rule is intended to address. For example the rule may specify that the log file types will be: (i) File: OS level log file; (ii) Database Table: a table that stores log content in a database; (iii) Windows Event Log: read events from windows event as log content.

A target property filter may be specified in the rule to filter for targets to specify conditions under which the rule is applicable, such as for example, a particular operating system (OS), target version, and/or target platform. For instance, the user could create a rule that is only for a given OS on a given platform (e.g., only for Linux OEL5 on X86_64 hardware).

When creating rules in some embodiments, the rule the may also include: (a) the name of the rule; (b) a severity level indicating how important the outcome of this rule is if this rule leads to an event being generated; (c) a description of the rule; and/or (d) a textual rationale of why this monitoring is occurring.

In some embodiments, one or more conditions can be established for which the rule will "trigger". Multiple conditions may be specified, where each condition can be combined with others using a Boolean operator. For example, a set of conditions that is ORed with others means that if any of these conditions match an entry in a log file under evaluation, then that entry triggers this rule. When the conditions are ANDed together, all clauses of the condition must be met for the condition to trigger an entry in a log file. The specified actions will then be taken as a response to this entry that is matched. The following is an example condition clause that includes a regular expression: "MESSAGE contains "START: telnet pid=[0-9]* from=[.]*"", where this condition triggers the rule if the message matches the regular expression.

The "operator" in the condition is how the comparison is to be performed. The following are some example operators that may be employed in some embodiments of the invention: (a) <, >, >=, <=: compare a value to be larger or smaller (or equal) than some set value; (b) Contains: pattern match with ability to include regular expression clauses, where an implicit wildcard may be placed at the beginning and end unless the user uses the ˆ and $ regular expression symbols to specify the beginning of a string or end of the string; (c) In: list of possible values; (d) Is: exact string match (no regular expression capability); (e) Is Not; (f) Does Not Contain; (g) Not In: List of values to not match.

Actions may be specified to identify what to do when a match is found on the selected sources for a given condition. For example, one possible action is to capture a complete log entry as an observation when matching conditions of the rule. This approach lets the system/user, when monitoring a log from any source and when a single entry is seen that matches the conditions of this rule, to save that complete entry and store it in the repository as an observation. Observations are stored for later viewing through the log observations UI or other reporting features. Another possible action is to create an event entry for each matching condition. When a log entry is seen as matching the specified conditions, this approaches raise an event. In some embodiments, the event will be created directly at the agent. The source definition will define any special fields that may be needed for capturing events if there are any. An additional option for this action is to have repeat log entries bundled at the agent and only report the event at most only once for the time range the user specified. The matching conditions can be used to help identify the existence of a repeat entry. Another example action is to create a metric for the rule to capture each occurrence of a matching condition. In this approach, a new metric is created for this rule using a metric subsystem. Thereafter, when there is a log entry that matches the rule's conditions, some number of the fields are captured as metric data and uploaded as part of this metric. The fields can be selected to include, for example, information such as "key" fields like target, time, source, etc.

At 504, one or more targets are identified in the system. The targets are individual components within the customer environment that that contain logs. These targets are associated with specific components/hosts in the customer environment. Example targets include hosts, database application, middleware applications, and/or other software applications, which are associated with one or more logs one or more hosts. More details regarding an approach to specify targets are described below.

At 506, an association is made between a target and a rule. Metadata may be maintained in the system to track the associations between a given target and a given rule. A user interface may be provided that allows a user to see what targets a selected rule is associated with and/or to add more associations, where the associations are the way the rule becomes active by associating the rule against a real target.

Thereafter, at 508, log collection and processing are performed based at least in part upon the association between the rule and the target. As discussed in more detail below, target-based configuration may involve various types of configuration data that is created at both the server-side and the target-side to implement the log collection as well as log processing.

The ability of the current embodiment to configure log collection/monitoring by associating targets with log rules provides unique advantages. This is because the user that configures log monitoring does not need to specifically understand exactly how the logs for a given application are located or distributed across the different hosts and components within the environment. Instead, the user only needs to select the specific target (e.g., application) for which monitoring is to be performed and to then configure the rules under which the log collection process is to be performed.

This solves the significant issue with conventional systems that require configuration of log monitoring on a per-host basis, where set-up and configuration activities need to be performed each and every time a new host is added or newly configured in the system, or even where new log collection/configuration activities need to be performed for existing hosts. Unlike conventional approaches, the log analytics user can be insulated from the specifics of the exact hosts/components that pertain to the logs for a given target. This information can be encapsulated in underlying metadata that is maintained by administrators of the system that understand the correspondence between the applications, hosts, and components in the system.

Figure 6:
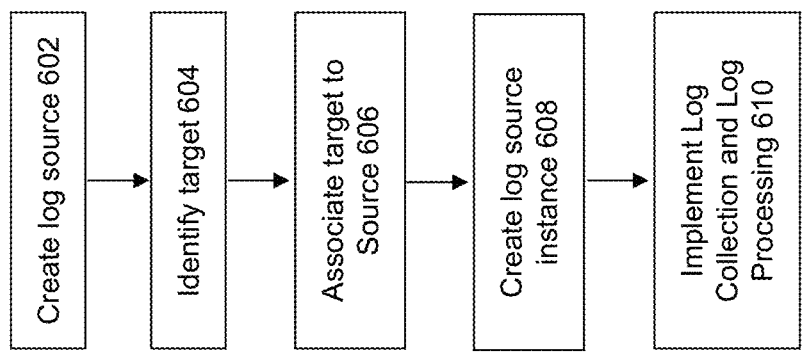
FIG. 6 shows a flowchart of an approach to implement a log collection configuration by associating a log source with a target.

Instead of, or in addition to the rules, log processing can also be configured by associating a log source to a target. FIG. 6 shows a flowchart of an approach to implement a log collection configuration by associating a log source with a target. At 602, one or more log sources are created. The log source defines where log files are located and how to read them. The log source may define a source type that indicates how the source content is gathered. The following are example source types: (a) File—identifies a readable file from the OS level that can be accessed using regular OS-level file operations; (b) Database Table—a table that stores log entries (e.g.: database audit table); (c) Windows Event System—an API that provides access to event records. One or more source names may be defined for the log source. In addition, the log source may be associated with a description of the source. It is noted that log sources can also be used when creating log monitoring rules (as described above).

The log source may also be associated with a file pattern and/or pathname expression. For instance, "/var/log/messages*" is an example of a file pattern (that may actually pertain to a number of multiple files). Regarding file patterns, one reason for their use in the present log analytics system is because it is possible that the exact location of the logs to monitor varies. Some of the time, a system will expect logs to be in a particular place, e.g., in a specific directory. When the system is dealing with a large number of streaming logs, it may not be clear which directory the logs are expected to be in. This prevents a system that relies upon static log file locations to operate correctly. Therefore, the file pattern is useful to address these possibly varying log locations.

In some embodiments, a log source is created by specifying a source name and description for the log source. The definition of the log source may comprise included file name patterns and excluded file name patterns. The file name patterns are patterns that correspond to files (or directories) to include for the log source. The excluded file name patterns correspond to patterns for files (or directories) to explicitly exclude from the log source, e.g., which is useful in the situation where the included file name pattern identifies a directory having numerous files, and some of those files (such as dummy files or non-log files) are excluded using the excluded file name pattern. For each pattern, the system captures the pattern string, the description, and the base parser (log type) that will be used to parse the file. The base parser may define the basic structure of the file, e.g., how to parse the data, hostname, and message from the file.

The definition of the log source may also specify whether the source contains secure log content. This is available so that a source creator can specify a special role that users must have to view any log data may be captured. This log data may include security-related content that not any target owner can view.

As noted above, the log rules may reference log sources, and vice versa. In some embodiments, the system metadata tracks these associations, so that a count is maintained of rules that are currently using sources. This helps with understanding the impact if a source and/or rule is changed or deleted.

At 604, one or more targets are identified. As noted above, targets are components within the environment that contain, correspond, and/or create logs or other data to be processed, where the targets are associated with specific components/hosts in the customer environment. Example targets include hosts, database application, middleware applications, and/or other software applications, which are associated with one or more logs one or more hosts.

At 606, an association is made between a target and a source. Metadata may be maintained in the system to track the associations between a given target and a given source. A user interface may be provided that allows a user to see what targets a selected source is associated with and/or to add more associations.

The association of the target to the source creates, at 608, a specific instance of the log source. For example, consider a log source that generically specifies that a given file is located at a given directory location (e.g., c:/log_directory/ log_file). It may be the case that any number of servers (Server A, Server B, Server C, Server D) within a customer environment may have a copy of that file (log_file) in that directory (c:/log directory). However, by associating a specific target (e.g., Server A) to the log source, this creates an instance of the log source so that the new instance is specific regarding the log file in the specified directory on a specific target (e.g., to begin monitoring c:/log_directory/log_file specifically on Server A).

Thereafter, at 610, log collection and processing are performed based at least in part upon the association between the rule and the log source. As discussed in more detail below, target-based configuration may involve various types of configuration data that is created at both the server-side and the target-side to implement the log collection and processing activities.

There are numerous benefits when using this type of model for configuring log collection. One benefit is that the Log Types, Sources, Rules can be easily reused as necessary. In addition, this approach avoids having to make numerous duplicate configurations by enabling sharing at multiple levels. Moreover, users can create custom rules that use sources and log types defined by other people or ship with the product. This approach also easily builds on top of shared knowledge.

Associating rules/sources to targets provides knowledge that identifies where to physically enable log collections via the agents. This means that users do not need to know anything about where the targets are located. In addition, bulk association of rules/sources to targets can be facilitated. In some embodiments, rules/sources can be automatically associated to all targets based on the configuration. As noted above, out-of-the-box configurations can be provided by the service provider. In addition, users can create their own configurations, including extending the provided out-of-the-box configurations. This permits the users to customize without building their own content.

Figure 7:
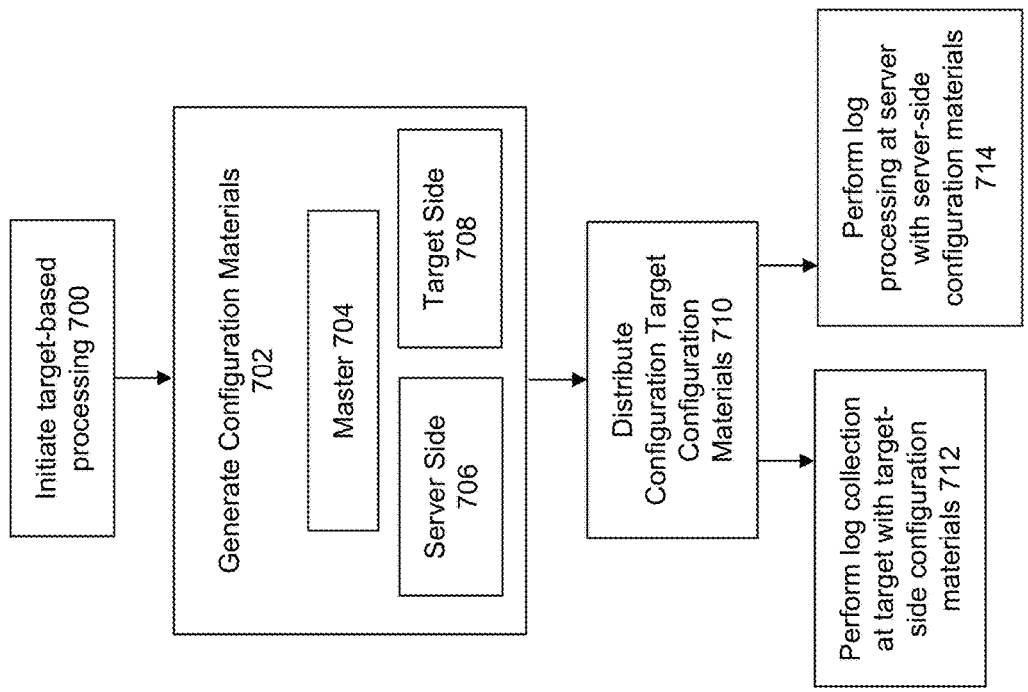
FIG. 7 shows a flowchart of an approach to implement target-based configuration for log monitoring.

FIG. 7 shows a flowchart of an approach to implement target-based configuration for log monitoring. This process generates the creation, deployment, and/or updating of configuration materials for log monitoring. In some embodiments, configuration materials are embodied as configuration files that are used by the log monitoring system to manage and implement the log monitoring process.

At 700, target-based processing is initiated. Example approaches for initiating target-based processing includes, for example, installation of a log analytics agent onto a specific log collection location. The target-based processing pertains to associations made between one or more targets and one or more log sources and/or rules.

At 702, configuration materials are generated for the target-based processing. In some embodiment, the target-based configuration file is implemented as configuration XML files, although other formats may also be used to implement the configuration materials. The target-based configuration file may be created at a master site (e.g., to create a master version 704), with specific versions then passed to both the server side and the target side.

The target-side materials 708 may comprise those portions of the configuration details that are pertinent for log collection efforts. This includes, for example, information about log source details and target details. The server-side materials 706 may comprise portions of the configuration details that are pertinent to the server-side log processing. This includes, for example, information about parser details.

In some embodiments, a database at the server maintains a master version and a target version of the configuration materials. As noted above, the target version includes configuration details that are pertinent to log collection efforts, and is passed to the customer environment to be used by the agent in the customer environment to collect the appropriate log data from the customer environment. The master version includes the full set of configuration details needed at the server, and becomes the 'server side" materials when selected and used for processing at the server. This may occur, for example, when the log data collected at the targets are passed to the server, where the transmission of the log data includes an identifier that uniquely identifies the target-side materials used to collect the log data (e.g., the configuration version or "CV" number 903 shown in the example targets-side materials of FIG. 9). When this data is received at the server, the identifier is used to determine the corresponding master version of the materials that have the same identifier number (e.g., as shown in field 1003 in the example server-side materials of FIG. 10). That master version is then used as the server-side materials to process the received log data. Therefore, in this embodiment, the master version 704 and the server-side materials 706 are identical, but having different labels depending upon whether the material is currently in-use to process the log data. In an alternative embodiment, the master version may differ from a server version, e.g., where the materials are used on multiple servers with different configuration details.

At 710, the configuration materials are then distributed to the appropriate locations within the log processing system. In some embodiments, the target-side materials 708 are distributed to the customer system as the sniffer configuration files 332 shown in FIG. 3A. With regards to the server-side materials 706, the materials are "distributed" as the log configuration files 111 shown in FIG. 1A, where the distribution does not actually require the materials to be distributed across a network, but merely indicates that the materials are obtained from another component within the server (e.g., on an as-needed basis).

Thereafter, at 712, log collection processing is performed at the target using the target-side configuration materials. In addition, at 714, server-side log processing is performed using the server-side configuration materials.

Figure 8:
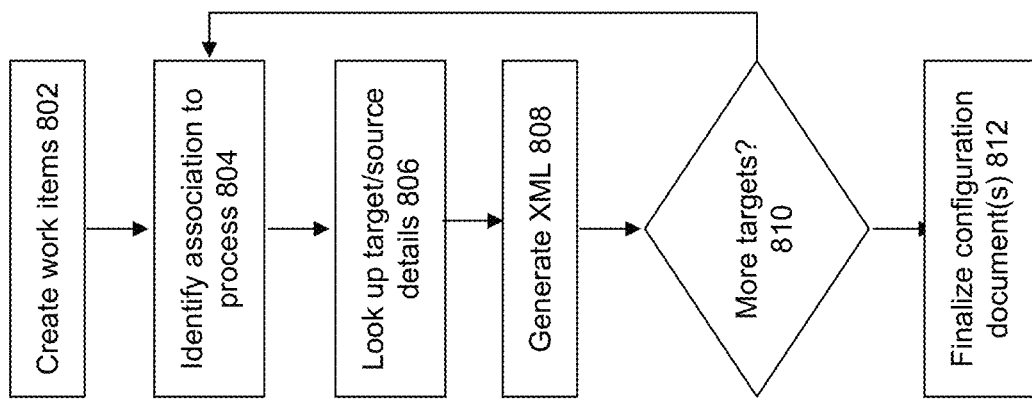
FIG. 8 shows a more detailed flowchart of an approach to implement target-based configuration for log monitoring according to some embodiments of the invention.

FIG. 8 shows a more detailed flowchart of an approach to implement target-based configuration for log monitoring according to some embodiments of the invention. At 802, one or more work items for processing target associations are created in the system. For example, this type of work may be created upon installation of the log analytics agent onto a target, where recognition of this installation causes a work item to be created for the target-based configuration materials. A list of target types are identified that have at least one auto-association rule (e.g., from a database of the associations). A list of targets is generated for which there is a need to be associated with auto-enabled rules. These steps are equivalent to putting association tasks into a queue (e.g., database table) by a producer entity/process, which are then processed by one or more consumer entities/processes.

One or more consumer/worker entities may wake up periodically to process the work items. For example, a worker entity (e.g., thread or process) wakes up (e.g., every 10 seconds) to check whether there are any pending association tasks. The set of one or more workers will iterate through the tasks to process the work in the queue.

At 804, one of the workers identifies an association task to process. At 806, the association request is processed by accessing information collected for the rules, sources, parsers, fields, and/or target. This action identifies what target is being addressed, finds that target, and then looks up details of the log source and/or log rule that has been associated with the target.

At 808, the worker then generate configuration content for the specific association task that it is handling. In some embodiments, the configuration content is embodied as XML content. This action creates both the target-side details and the server-side details for the configuration materials. For the server-side, this action will create configuration data for the server to process collected log data. For example, parser details in XML, format are created for the server-side materials for the log data expected to be received. For the target-side, this action will create configuration data for log collection from the target. For example, as discussed below, variable pathnames (e.g., having variables instead of absolute pathnames) may be specified for a given log source to identify a directory that contains log files to monitor. These varying pathnames may be replaced with actual pathnames and inserted into the target-side materials at step 808.

A determination is made at 810 whether there are any additional association tasks to process. If there are additional tasks on the queue, then the process returns back to 804 to select another task to process. If not, then at 812, the configuration materials are finalized.

It is noted that the same configuration/XML file can be used to address multiple associations. For example, if multiple targets are on the same host, then a single configuration file may be generated for all of the targets on the host. In this case, step 808 described above appends the XML, content to the same XML, file for multiple iterations through the processing loop.

Updates may occur in a similar manner. When a change occurs that requires updating of the materials, then one or more new association tasks may be placed onto a queue and addressed as described above. Furthermore, de-associations may also occur, e.g., where the log analytics agent is de-installed. In this situation, the configuration files may be deleted. When a target is deleted, a message may be broadcast to notify all listeners about this event by a target model service, which may be consumed to delete the corresponding associations and to update the XML content.

FIG. 9 illustrates example XML configuration content 900 according to some embodiments of the invention. This is an example of target-side content that may be placed on the host that holds the target. This XML configuration content 900 defines a rule to collect Linux system message logs with file pattern "/var/log/messages*" on host XYZ.us.oracle.com. Portion 902 identifies a base parser for the association being addressed. Portion 903 provides an identifier for the version number ("configuration version" or "CV") of the content 900, which is used to match up against the corresponding server-side materials having the same version number. Portion 904 identifies the ID of a log rule. Portion 906 identifies a specific target. Portion 908 identifies a target type. Portion 910 identifies a source type. Portion 912 identifies a parser ID for the source. The logs will be parsed based on some defined parser. Such configuration files reside on sniffers and the log collection processes collect logs based on the defined log sources.

In the log processor at the server side, additional information can be included in the configuration file to facilitate the log parsing, e.g., as shown in the server-side content portion 1000 of FIG. 10. The FieldDef portion 1001 indicates the data type for the service. The Log Source portion 1002 indicates the logs are of "os_file" type. The BaseParse portion 1004 defines the way to parse the log entries based on defined regular expressions in portion 1006. Portion 1003 provides an identifier for the version number of the content 1000, which is used to match up against the corresponding target-side materials having the same version number.

In addition to the above-described auto-associations, target-source manual associations may also be performed. For example, a user interface may be provided to perform the manual associations. This also causes the above-described actions to be performed, but is triggered by the manual actions.

Re-syncshronization may be performed of target-source associations. To explain, consider that when a log analytics agent is installed, monitored targets connected through the agent can be associated with certain pre-defined log sources Similarly, when the agent is de-installed, such associations can be deleted from the appropriate database tables. In addition, when a target is added to be monitored by an agent, the target can be associated with certain pre-defined log sources for that target type, and when the target is deleted from an agent, such association can be deleted from database tables.

Over time, these associations could become out-of-sync due to various reasons. For example, when a log analytics agent is being installed, the auto-association may occur due to some network issue that causes the loss of the configuration materials during its transfer. In addition, when a target is added or deleted, an event may not processed properly so the configuration XML, file when updating does not occur as appropriate.

To handle these cases and maintain the association consistency between targets and their corresponding log sources, a web service is provided in some embodiments to synchronize the associations periodically. In at least one embodiment, only the auto-associations are synched, and not the manual associations customized by users manually.

Associations may be performed for a specific log analytics agent. A delta analysis can be performed between targets in a data model data store and targets in a log analytics data store to implement this action. Processing may occur where: (a) For targets in data model data store but not in log analytics data store, add associations for these targets; (b) For targets not in data model data store but in log analytics data store, delete associations for these targets; (c) For targets in data model data store and log analytics data store, keep the same associations for these targets in case of user customization. One potential issue for adding associations pertains to the situation where a user may have deleted all associations for a particular target so there is no entry in the log analytics data store, but there is an entry in the data model data store. The issue is that when applying the above approach, the auto-associations not wanted could be brought in again after the synchronization operation. To avoid this, the system can record the user action to identify the potential issue.

In addition, associations may be synchronized for a specified tenant. When this action is performed, delta analysis can be performed between the agent for the data model data store and agent for the log analytics data store. Processing may occur by: (a) For an agent in the data model data store but not in the log analytics data store, add associations for these agents; (b) For agents not in the data model data store but in the log analytics data store, delete associations for these agents; (c) For agents in the data model data store and the log analytics data store, perform the same delta analysis and synchronization as described above.

Synchronization may be performed for associations for all tenants. When this action is performed, it should perform agent-level synchronization as described for each tenant.

Turning the attention of this document to file patterns, one reason for their use in log analytics systems is because it is possible that the exact location of the logs to monitor varies. Most of the time, a system will expect logs to be in a particular place, in a specific directory. When the system dealing with a large number of streaming logs, it may not be clear which directory the logs are expected to be in. This prevents a system that relies upon static log file locations from operating correctly.

The inventive approach in some embodiments can associate log analysis rules to variable locations. One approach is to use metadata that replaces variable parts that correspond to locations for the log files. A path expression is used to represent the pathname for the log files, where the path expression includes a fixed portion and a varying portion, and different values are implemented for the variable part. The placeholder for location is eventually replaced with the actual location in the directory path.

Some embodiments provide for "parameters", which are flexible fields (e.g., text fields) that users can use in either the include file name patterns or exclude file name patterns. The parameters may be implemented by enclosing a parameter name in curly brackets {and}. A user-defined default value is provided in this source. A user can then provide a parameter override on a per target basis when associating a log monitoring rule using this source to a target. The overrides are particularly applicable, for example, with regards to changes from out-of-the-box content (e.g., to override rules, definitions, etc. without actually changing the OOTB content). This is implemented, for example, by implementing a mapping/annotation table that includes the user overrides and indicate of an override for the OOTB content.

The reason this is very helpful is because in the log sources, paths may be defined for log files to monitor. In some cases, the paths are fixed, such as in the Linux syslog file, the path is "/var/log/messages*". However, in other cases, one may want to monitor a database alert log, where each database target will be installed in a completely different path, and the path to find the alert log may be different. For example, the alert log for one database is located at this location: "/xxx/db/yyyy/oracle/diag/rdbms/set2/set2/alert/log*.xml". The underlined portions may vary for every database target. However, each target has the notion of target properties. Included in these properties are metadata that can be used to fill in the variable parts in the path. In the current embodiment, one can express this path instead as: "{DIAGNOSTIC_DEST}/diag/rdbms/{SID}/{SID}/alert/log*.xml"

When this source is used in a rule and this rule is associated to the target, the system replaces the parameters "DIAGNOSTIC_DEST" and "SID" with those that are known for that target. This allows the system to associate a single rule and source to thousands of targets at once.

As another example, the user may want to monitor the pattern: "/xxx/oracle/log/*". In this case, "/xxx/oracle" is a variable path depending on the host. One could instead write the pattern as: "{INSTALL_DIR}/log/*". For this source, the user can provide a default value (/xxx/oracle) to the INSTALL_DIR parameter. Later, when rule is associated to a target, the user can provide a target override value of "/xxx/oracle" for this parameter on this target without having to create a new source or rule.

With regards to system-defined fixed parameters, there may be a case where the user wishes to reference a built-in parameter (e.g., ORACLE_HOME). Here, the system will replace that variable with the ORACLE_HOME that is known for the selected target. The pattern could be written as: "{ORACLE_HOME}/log/*". This path will automatically be understood by the agent, where ORACLE_HOME is a special built-in parameter that does not need a default to be set by the user. The system could be provided with a list of fixed parameters that integrators/users can choose to use.

Figure 11:
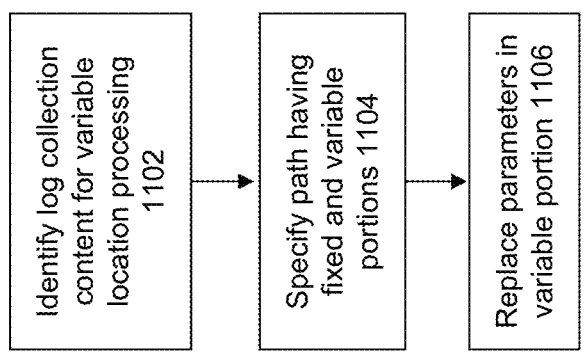
FIG. 11 shows a flowchart of one possible approach to implement this aspect of some embodiments of the invention.

FIG. 11 shows a flowchart of one possible approach to implement this aspect of some embodiments of the invention. At 1102, identification is made of location content for which it is desirable to implement variable location processing. This situation may exist, for example, when the system is handling a large number of streaming logs from possibly a large number and/or uncertain of directory locations. The log data may be located at target locations that are addressed using a pathname that varies for different database targets.

At 1104, a path is specified for the target locations having a fixed portion and a varying portion. The varying portion may be represented with one or more parameters. During log processing, at 1106, the one or more parameters are replaced with values corresponding to one or more target log files, wherein a single rule for implementing log monitoring is associated with multiple different targets to be monitored.

This approach is quite advantageous over approaches where every log is in a different directory that one cannot know about ahead of time, and where a separate forwarder mechanism would have to be set up for each path. Instead, the present approach can be used to set up one rule for a very large number of paths.

In some embodiments, configuration information from the log analytics system can be coupled to this approach to configure and setup the rules for identifying log file assignments. Some examples of configuration information that can be used include, for example, how a database is connected, how the components are connected, which datacenter is being used, etc.

Some embodiments specify how to map sources to targets based on their relationships. For instance, a defined source Source1 can be assigned to all related targets belonging to a certain system. Any association type and/or rule can be used in this embodiment, e.g., where a common set of association types is used to provide configuration information useful for determining rules for log locations. Such association types may include, for example, "contains", "application_contains", "app_composite_contains", "authenticated_by", "composite_contains (abstract)", "cluster_contains", "connects_through", "contains (abstract)", "depends_on(abstract)", "deployed_on", "exposes", "hosted_by", "installed_at", "managed_by", "monitored_by", "provided_by", "runs_on (abstract)", "stores_on", "stores_on_db", and "uses (abstract)".

It is noted that the target relationship information/model can be used in other ways as well. For example, the target model can also be used to help correlate log entry findings to aid in root cause analysis. As another example, the host model can be used for comparing all hosts in one system. For instance, if there are a number of databases in a first system, this feature can be used to see logs across these systems together, and in isolation from databases used for a second system.

Figure 12:
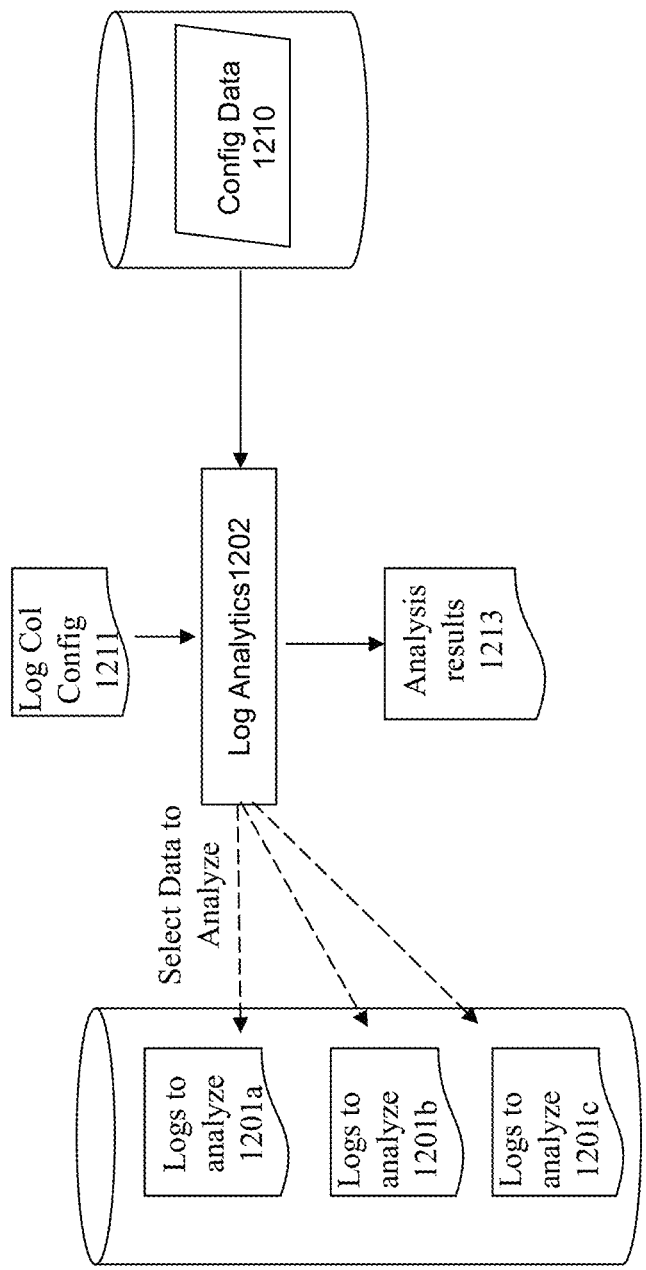
FIG. 12 illustrates an architecture for implementing some embodiments of the inventive approach to associate log analysis rules to variable locations.

FIG. 12 illustrates an architecture for implementing some embodiments of the inventive approach to associate log analysis rules to variable locations. Here, the log analytics engine 1202 operates by accessing log collection configuration files 1211. Log collection configuration files 1211 is implemented to represent a path where the target location may have both a fixed portion and a varying portion. The varying portion may be represented with one or more location parameters. In this example, different locations may exist for logs 1202*a*, 1201*b*, and 1201*c*. By replacing the variable portion, the specific location for the log of interest may be selected by the log analytics engine 1202, and processed to generate analysis results 1213.

Here, the reference material 1210 may be accessed to identify the correct replacement of the variable portions of the paths for the target locations. Any suitable type of reference materials may be implemented. As noted above, a defined source Source1 can be assigned to all related targets belonging to a certain system, and/or an association type and/or rule can be used as well. In addition, target relationship information/models can be employed as well as the reference material.

Embodiments of the invention therefore provides improved functionality to perform target-based log monitoring. Two possible use cases this functionality includes log monitoring and ad hoc log browsing. Log monitoring pertains, for example, to the situation where there is continuous monitoring and capture of logs. Some embodiments of log monitoring pertains to the some or all of the following: (a) monitor any log for any target and capture significant entries from the logs; (b) create events based on some log entries; (c) identify existence of log entries that can affect a compliance score; (d) perform user as well as integrator defined monitoring; (e) capture log entries that are not events to enable analytics on a subset of all logs; (f) use cases such as intrusion detection, potential security risk detection, problem detection; (g) implement long term persistent storage of log contents; (h) search for log content; (i) customizable search-based views; (j) log anomaly detection and scoring Ad hoc log browsing pertains, for example, to the situation where there is not continuous monitoring of logs. In this approach, the user can browse live logs on a host without having to collect the logs and send them up to the SaaS server. The model for configuring what to monitor is similar to what was described earlier. The difference pertains to the fact that the user can select a rule, source, and some filters from the UI and the search is sent down to agent to obtain log files that match and bring them back, storing them in a temporary storage in the server. The user can continue to narrow their search down on that result set. If the user adds another target, rule, or extends the time range, the system goes back to the agent to obtain only the delta content, and not the entire content again. The user can therefore get the same benefits of log analytics without configuring continuous log monitoring. The feature can be very low-latency since the system only needs to go back to get more data from agent when the search is expanded. All searches that are narrowing down current result set goes against the data that have been cached from a previous get from the agent.

The embodiments of the invention can be used to store log data into a long-term centralized location in a raw/historical datastore. For example, target owners in the company IT department can monitor incoming issues for all responsible targets. This may include thousands of targets (hosts, databases, middle wares, and applications) that are managed by the SaaS log analytics system for the company. Many log entries (e.g., hundreds of GB of entries) may be generated each day. For compliance reasons, these logs may be required to be stored permanently, and based on these logs, the data center manager may wish to obtain some big pictures of them in long run and IT administrators may wish to search through them to figure out some possible causes of a particular issue. In this scenario, a very large amount of logs could be stored in a centralized storage, on top of which users can search logs and view log trends with acceptable performance. In some embodiments, the log data can be stored in an off-line repository. This can be used, for example, when data kept online for a certain period of time, and then transferred offline. This is particularly applicable when there are different pricing tiers for the different types of storage (e.g., lower price for offline storage), and the user is given the choice of where to store the data. In this approach, the data may held in offline storage may be brought back online at a later point in time.

The logs can be searched to analyze for possible causes of issues. For example, when a particular issue occurs to a target, the target owner can analyze logs from various sources to pinpoint the causes of the issue. Particularly, time-related logs from different components of the same application or from different but related applications could be reported in a time-interleaved format in a consolidated view to help target owner to figure out possible causes of the issue. The target owner could perform some ad-hoc searches to find same or similar log entries over the time, and jump to the interested log entry, and then drill down to the detailed message and browse other logs generated before/after the interested point.

In some embodiments, restrictions can be applied such that users have access only to logs for which access permissions are provided to those users. Different classes of users may be associated with access to different sets of logs. Various roles can be associated with permissions to access certain logs.

Some embodiments can be employed to view long-term log distribution, trends, and correlations. With many logs generated by many different targets and log sources over long time, data center managers may wish to view the long-term log distributions and patterns.

Some embodiments can be employed to search logs to identify causes of an application outage. Consider the situation where an IT administrator or target owner of a web application receives some notification that some customers who used the application reported that they could not complete their online transactions and the confirmation page could not be shown after the submit button was clicked. With embodiments of the invention, the IT administrator can search the logs generated by the application with the user name as key and within the issue reporting time range. Some application exception may be found in the log indicating that some database error occurred when the application tried to commit the transaction. By adding the database and its corresponding hosting server via target association relationship and their availability related log sources for the search, the IT administrator could browse the logs around the application exception time to find some database errors, which was related for example to some hosting server partial disk failure and high volume of committing transactions.

Some embodiments can be employed to view long-term log distributions, trends, and correlations by tags. A data center manager may define some tags for logs collected in the data center, such as security logs for production databases, security logs for development servers, logs for testing servers, noise logs, etc. The data manager may be interested, for example, in knowing the followings: log distributions by these tags over the past half year, their daily incoming rates during last month, and whether there are any correlations between the security log entries for production databases and the changes of their compliance scores during a given time period.

Some embodiments permit log data to be stored as metrics. In certain embodiments, the system will store several log fields as key fields. The key fields will include (but may not be limited to): Time, Target, Rule, Source, and Log File. The system may also create a hash or GUID to distinguish possible log entries that have the same time and all other key fields. When a rule that is using this metric action for log entries is associated with the first target, a metric extension is created and deployed. This metric extension will be named similar to the rule to make it easy for the user to reference it.

In some embodiments, the log monitoring rule has a possible action to create an event when a log entry matches the condition of the rule. Additionally, users will be able to indicate that this event should also trigger a compliance violation which will cause an impact on the compliance score for a compliance standard and framework.

As noted above, one possible use case is to provide a log browser, e.g., where browsing is employed to browse live logs on a host without collecting the logs and sending them to a SaaS Server. The user can select a rule, source, and some filters from the UI and the search is sent down to agent to obtain log files that match and bring them back, storing them in a temporary storage in the server. One use case for this feature is to allow users to browse a short time period of log files across multiple targets in a system to try to discover a source of a problem, especially when there is a rich topology mapping and dependency mapping of the customer's environment. This content can be used to help find related elements and show the logs together. This allows the users to see logs for all targets related to a given system for instance and see what happened across all targets in time sequence. In many cases, when there is a target failure, it may be a dependent target that is experiencing the problem, not the target that is failing.

The user may choose to start a new log browsing session in context of a system/group/individual target. If coming in from a target home page, the target home page context is to be retained. This means that the outer shell of the page still belongs to the target home page, and just the content panel will contain the browse UI functionality. This means the browse UI can be implemented to be modular to plug into other pages dynamically. In some embodiments, multiple row-content can be provided per entry to show additional details per row. This is one row at a time, or the user could decide to perform this for all rows. Sorting can be provided on the parsed fields, but in addition, can be used to see additional details per row (including the original log entry).

Search filters can be provided. For example, a search filter in the form of a date range can be provided, e.g., where the options are Most Recent, and Specific Date Range. With the Most Recent option, the user can enter some time and scale of Minutes or Hours. With the Specific Date Range, the user will enter a start and end time. With the date range option, Targets, Sources, and Filters can be specified. These allow the users to select what they want to see in this log browsing session. After the user has selected the targets, sources, and applied any filters, they can begin the browse session to initiate retrieval of the logs from various targets and ultimately have them shown on the interface.

Search queries can be implemented in any suitable manner. In some embodiments, natural language search processing is performed to implement search queries. The search can be performed across dependency graphs using the search processing. Various relationships can be queried in the data, such as "runs on", "used by", "uses", and "member of".

In some embodiments, the search query is a text expression (e.g., based on Lucene query language). Users can enter search query in the search box to search logs. The following are example of what could be included in the search query: (a) Terms; (b) Fields; (c) Term modifiers; (d) Wildcard searches; (e) Fuzzy searches; (d) Proximity searches; (f) Range searches; (g) Boosting a term; (h) Boolean operators; (i) Grouping; (j) Field grouping; (k) Escaping special characters.

A tabular view can be provided of the search findings. Some query refinement can be performed via table cells to allow users to add/remove some field-based conditions in the query text contained in the search box via UI actions. For example, when a user right-mouse clicks a field, a pop-up provides some options for him/her to add or remove a condition to filter the logs during the searches. This is convenient for users to modify the query text, and with this approach, users do not need to know the internal field names to be able to refine the query at field level.

There are numerous ways that can be provided to list fields for user to select/de-select them for display purpose in the search findings table. One example approach is based on static metadata, and another possible way is based on dynamic search results.

For list fields based on static metadata, a basic field shuttle is used to list all defined fields. Some example fields that can be defined by the log entry metadata include: (a) Log file; (b) Entry content; (c) Rule name; (d) Source name; (e) Parser name; (f) Source type; (g) Target type; (h) Target name. The values of these fields can be obtained from the agent with log entry (although source, parser, rule, target are all GUIDs/IDs) that will need to be looked up at display time.

For list fields based on dynamic search findings, the top n fields (e.g., 10) will be shown that would be suggested as making the most difference for that search. A "more fields" link will lead to a popup for users to select other fields. Users can see more information of those fields on the popup than form the View menu. When listing the fields, the system could use any suitable algorithm, for example, to assign a number to each field that is influenced by how many rows in the search results having non-null value, or how many different values there are across all search results for that field, etc.

Given so many dynamic fields available for users to select/de-select, it is desired for a user to be able to save the fields selection (field names and sizes). The system can store the last selected fields so when the user comes back to the page, he/she still gets the fields picked last time.

There may be a very large number (e.g., thousands) of log entries resulting from a search and it may not be possible for users to browse all of them to find the interested logs. For a particular search, users should be able to drill down to the details of the search findings with a few clicks. In some embodiments, features include clickable bar charts and table pagination. With these navigation features, plus customizable time range, users should be able to jump to some interested point quickly. Correspondingly, some embodiments provide for drilling up from details to higher levels so users can easily navigate to desired log entries via bar graphs. An example use case is: after users drill down a few levels they may want to drill up back to a previous level to go down from another bar. After users identify an interested log entry via some searches, they likely want to explore logs from a particular log source around the interested log entry, or explore logs from multiple log sources around the interested log entry in time-interleaved pattern. Some embodiments provide an option for users to browse forward/backward the logs around a specified log entry page by page. A graphical view can be provided of the search findings. This allows the user to pick fields to render the results graphically.

Some embodiments pertain to improved techniques to address log distributions, trends, and correlations. For search findings resulted from a particular search, distributions can be based on log counts to give users some high-level information about the logs. For each distribution type, the top n (e.g., 5 or 10) items are listed with number of found logs (where a "more . . . " link will lead to a popup with all other items listed). When users select a particular item, only logs corresponding to that item would be shown in the right table, so the action is equivalent to filtering the search findings with that item. Such information may be presented: (a) By target type; (b) By target, such as target owner and/or lifecycle status; (c) By log source; (d) By tag. Besides showing the search findings in the results table, the system can also provide options for users to switch between table view and the corresponding distribution chart view.

In some embodiments, results can be filtered by selecting distribution items. Users can filter the results table by selecting one or more distribution items. By default, all distribution items are selected and all log entries are listed in the results table. After selecting one or more distribution items, users can navigate the log entries via pagination. With one or more distribution items selected, when users click the search button for a new search, the selections of distribution items will be reset to be selected for all distribution items.

Some embodiments provide a feature to show search finding trends. Some embodiments provide a feature to show search finding correlations. Related to this feature, some embodiments provides launching links for users to navigate to search/view detailed logs when they perform correlation analysis among events, metrics, and infrastructure changes. Launching links could be provided, e.g., for users to navigate to an IT analytics product to analyze/view detailed events/metrics when they wish to see some bigger pictures related to the logs here.

Another feature in some embodiments pertains to process-time extended field definitions. Even with the same baseline log type, it is possible for individual log entries to contain inconsistent information from one log to the next. This can be handled in some embodiments by defining base fields common to the log type, and to then permit extended field definitions for the additional data in the log entries.

To explain, consider that a source definition defines log files to monitor. The log files are parsed into their base fields based on the log type definition. One can extract additional data that is not consistent across all log entries, e.g., as shown in 1300 of FIG. 13. In this figure, the base fields that are parsed from the log entries are Month, Day, Hour, Minute, Second, Host, Service, Port (optional), and Message. The goal is to extract IP address and Port out of the second log entry. This goal may not be obtainable in certain implementations as part of the log type, e.g., since not every log entry has this structure. Here, the Message field for the second entry has the following content:

Accepted publickey for scmadm from xxx.xxx.1.1 port xyz ssh2

In some embodiment, a definition is made for an Extended Field Definition on the Message field using a format such as:

Accepted publickey for.* from {IP Address} port {Port} ssh2

For that log entry, two new field IP Address and Port will be parsed out and will be usable for reporting, searching, etc. This extraction happens as the data is being processed at collection time.

According to some embodiments, the processing for implementing process-time extended field definitions comprises: identifying one or more log files to monitor, wherein some of the entries in the one or more log files may include additional data that does not exist in other entries or is inconsistent with entries in the other entries, such as an additional IP address field in one entry that does not appear in another entry; identifying a source definition for one or more log files to monitor; parsing the one or more log files into a plurality of base fields using the source definition; defining one or more extended fields for the one or more log files; and extracting the one or more extended fields from the one or more log files.

Therefore, some embodiments permit the user to add extended field definitions. These are defined patterns that are seen within a field. A user could perform a create-like on a source and then the source and all extensions will become a new user-created source. The extended field definition defines new fields to create based on the content in a given file field. In some embodiments, the extended field definitions (and tagging) can be applied retroactively. This allows past log data to be processed with after-defined field definitions and tags.

Figure 14:
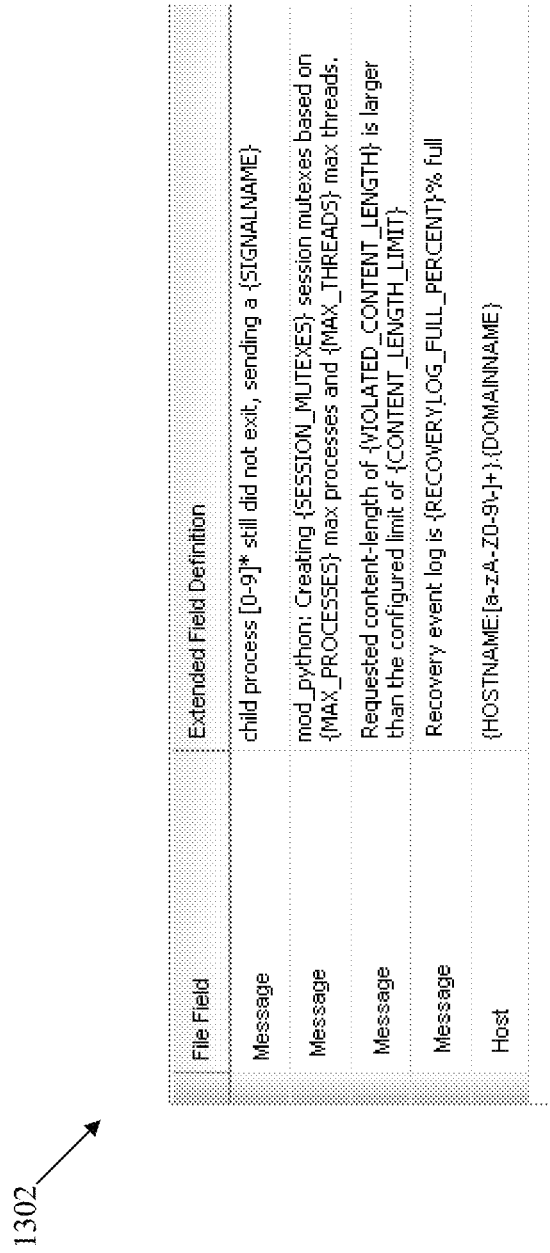
FIG. 14 shows some example field definitions.

FIG. 14 shows some example field definitions 1302. For the first case in the table, the user is specifying to look at the "Message" file field that comes from the log entry and is parsed by the file parser. This Message field will have text in it, but the user has identified that they want to capture the SIGNALNAME part of the message as a new field for this specific message. This new field (SIGNALNAME) can now become viewable in the captured log entries, viewable in the Log Browser, and can also be stored as part of a metric if a rule is created to do so. The extended field definition uses the entire contents of the Message in this example. The user could bind either side of their expression with a wildcard pattern. For instance, the definition could have been simply "sending a {SIGNALNAME}". The text that is shown is known to be static text that never changes for this log message. The use of [0-9]* in the expression means that any number of numeric characters can be located here, but they will just be ignored (since there is no field name associated to name this field. The text that comes after the string "sending a" will get assigned to the variable SIGNAL-NAME.

The last entry is another example where the user has defined two new fields and in the first field, they have also defined the way to get this content using a regular expression. Here, there are some characters containing a-z, A-Z, 0-9 or a hyphen before a period '.'. Everything that matches that expression should be added to a new extended field called the HOSTNAME. Anything after the first period will be put into a new extended field called DOMAINNAME. The HOST field which came from the file parser will still have all of the content, but this extended field definition is telling our feature to add two NEW fields in addition to the HOST field (HOSTNAME and DOMAINNAME).

All extended field definitions where a new field is defined using the { } delimiters uses a parse expression. However in this example, except the HOSTNAME field in the last example, there is none shown. This is because in some embodiments, there is a default known regular expression pattern of (.)* which means any number of character. This expression is implicitly used if the user does not provide a regular expression. If there is static text, the system will take any characters between the two pieces of static text. If there is no static text or characters after a field expression, it is assumed that every character to the end of the file field is part of the new extended field's value (like DOMAINNAME in the last example and CONTENT_LENGTH_LIMIT in the third example.) This could lead to some issues if there were variants of this log entry that have additional text sometimes. The way to solve this is to also define the parse regular expression for each field and not rely on the default implicit (.)*.

Some embodiments provide the ability to define regular expressions and save them with a name. For instance, the regular expression for hostname used above is [a-zA-Z0-9\-]+.

One example of a saved regular expression may be:
IP_Address Regular Expression=>\d{1,3}\.\d{1,3}\.\d{1,3}\.\d{1,3}

When referencing this saved regular expression in the extended field definition, the last entry in the table above may look like this instead:
{HOSTNAME:@IP_Address}. {DOMAINNAME}
The new fields that will be created are HOSTNAME and DOMAINNAME. The referenced regular expression that was created and saved is called IP_Address. When the system performs the processing on the agent, it will replace the referenced regular expression "@IP_address" with the regular expression string:
"\d{1,3}\.\d{1,3}\.\d{1,3}\.\d{1,3}"
Extended expression definitions can be evaluated at the agent (e.g., using a Perl parsing engine) directly with minor changes to the input string from the user.

In some embodiments, field reference definitions can be provided. This provides a feature where users can provide a lookup table of a SQL query to transform a field which may have a not-easily-readable value into more human readable content. Three example use cases highlight this need: (a) In a log entry, there may be an error code field (either a core field or an extended field) that simply has a number, where the user can provide a lookup reference so that the system adds another new field to store the textual description of what this error code means; (b) In a log entry, there may be a field (either a core file field or an extended field) that has the GUID of a target, and the system can provide a lookup using a SQL query to a target table that will create another new field that stores the display name of the target; (c) IP to hostname lookup may also be performed as a common use case, where in a log, there may be IP addresses for clients, where the IP addresses are used to look up hostnames.

As noted above, log types (also referred to herein to include "Parsers" in some cases in this document) may also be defined to parse the log data. One example log type pertains to the "Log Parser", which is the parser that can be used to parse the core fields of the source. Another example log type pertains to a "Saved Regular Expressions", which can be used when defining extended field definitions. For example, a hostname can be defined via a regular expression as "[a-zA-Z0-9\-]+". This regular expression can be saved with a name and then used a later time when creating extended field definitions.

A log parser is a meta-data definition of how to read a log file and extract the content into fields. Every log file can be described by a single parser to break each log entry into its base fields. The log type may correspond to a parse expression field, such as for example, a Perl regular expression for parsing a file. When defining a log parser, the author identifies the fields that will always exist in the log file. In this case, the following are the fields that exist in every entry of the above log file:

Some fields may be very complex, meaning that the field will actually contain additionally structured content for some log entries but not for others. These may not be handled by the log file parser in some embodiments because it is not consistent in every line. Instead, when defining a source, extended fields can be defined to break this field into more fields to handle these cases.

Profiles can be implemented for various constructs in the system, such as parsers, rules, and sources. The profiles capture differences between different usages and/or versions of data items and products for users. For example, a source profile can be created that accounts for different versions of a user's products that are monitored, e.g., where a source profile changes the source definition between version 1 and version 2 of a database being monitored. Rule profiles may be used to account for differences in rules to be applied. As another example, parser profiles can be provided to adjust parsing functionality, e.g., due to difference in date formats between logs from different geographic locations. Different regular expressions can be provided for the different parser profiles.

With regards to a log entry delimiter, log files can have content that is always known to be one row per entry (syslog), or can have content that can span multiple lines (Java Log 4j format). The Log Entry Delimiter input lets the user specify to always parse this log file as one row per entry, or to provide a header parse expression that tells us how to find each new entry. The entry start expression will typically be the same as the first few sections of the parse expression. The system uses this expression to detect when a new entry is seen versus seeing the continuation of the previous entry. For this example, the entry start expression may be:

(A-Z{1}[a-z]{2})\s([0-9]{1,2})\s([0-9]{1,2}):([0-9]{2}): ([0-9]{2})

This expression looks for a strict month, day, hour, minute, second structure. If that exact sequence of characters is seen, this "line" is treated as the beginning of a new entry.

In some embodiments, a table is maintained corresponding to parsed fields, and which starts empty (no rows) as the parse expression is empty. As users are creating the parse expression, the fields being defined are added to this table. This can be implemented by monitoring the text entered in this field and when a ')' is added, a function is called to determine how many fields have been defined. The system can ignore some cases of (and), e.g., when they are escaped or when they are used with control characters.

For instance, consider the following parsing language:
([a-z]{2})\s([a-z0-9]+)

In this example, there are two pairs of ( ) which means there are two fields defined. The content inside is how to find the field from the log entry—The UI for this create parser page does not care about what is inside the parenthesis. This is evaluated and used on the agent only. The content outside of the (and) are just static text that helps parse the line (this UI also does not care about this). For creating the right number of fields in the table, the approach counts the number of ( ) pairs in the parse expression. For each field that is parsed out by the parse expression, the user provides a field name based on one of the existing common fields.

Therefore, what has been described is an improved system, method, and computer program product for implementing a log analytics method and system that can configure, collect, and analyze log records in an efficient manner. The log analytics system, method, and computer program product provide target-based configuration of log monitoring metadata. The log analytics system, method, and computer program product can be implemented in a cloud-based/SaaS-based architecture.

System Architecture Overview

Figure 15:
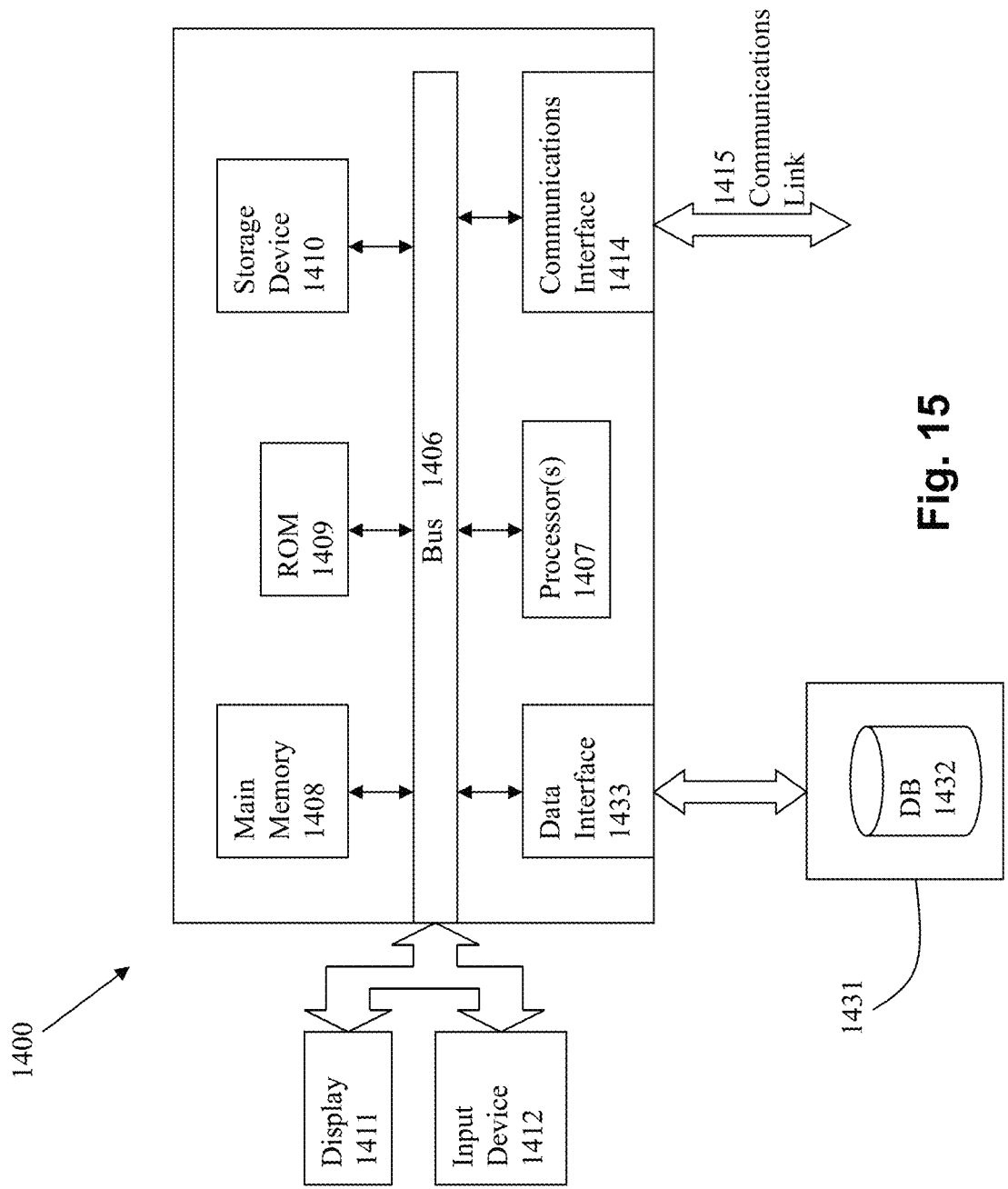
FIG. 15 shows an architecture of an example computing system with which the invention may be implemented.

FIG. 15 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method comprising:
storing a log collection configuration associated with a plurality of log collection targets, the log collection configuration comprising:
   a first included file name pattern, comprising (a) a first fixed portion and (b) a first variable portion, corresponding to a first set of one or more log files to include in log collection;
   a first excluded file name pattern, comprising (a) a second fixed portion and (c) a second variable portion, corresponding to a second set of one or more log files to exclude from the log collection;
based at least on the log collection configuration:
   replacing the first variable portion, in the first included file name pattern, with a first value associated with a particular log collection target in the plurality of log collection targets, to obtain a second included file name pattern;
   replacing the second variable portion, in the first excluded file name pattern, with a second value associated with the particular log collection target, to obtain a second excluded file name pattern;
   wherein the second set of one or more log files stored at a second set of one or more file locations that match the second excluded file name pattern are removed from the first set of one or more log files stored at a first set of one or more file locations that match the second included file name pattern to identify a third set of one or more log files to be collected;
transmitting to or storing on the particular log collection target, information including the second included file name pattern and the second excluded file name pattern for collecting the third set of one or more log files.

2. The method of claim 1, wherein the first included file name pattern is overridden on a per-target basis using a mapping table that maps an association to a target.

3. The method of claim 1, wherein a target property is established having metadata to define the first variable portion of the first included file name pattern.

4. The method of claim 1, wherein the first variable portion of the first included file name pattern is resolved based upon a specific host for a target.

5. The method of claim 1, wherein a set of fixed selectable parameters is configured for the first variable portion of the first included file name pattern.

6. The method of claim 1, wherein a rule defines a set of sources for the particular log collection target, along with conditions and actions to be triggered during monitoring of the particular log collection target.

7. One or more non-transitory machine-readable media storing instructions which, when executed by one or more processors, cause:
storing a log collection configuration associated with a plurality of log collection targets, the log collection configuration comprising:
   a first included file name pattern, comprising (a) a first fixed portion and (b) a first variable portion, corresponding to a first set of one or more log files to include in log collection;
   a first excluded file name pattern, comprising (a) a second fixed portion and (c) a second variable portion, corresponding to a second set of one or more log files to exclude from the log collection;
based at least on the log collection configuration:
   replacing the first variable portion, in the first included file name pattern, with a first value associated with a particular log collection target in the plurality of log collection targets, to obtain a second included file name pattern;
   replacing the second variable portion, in the first excluded file name pattern, with a second value associated with the particular log collection target, to obtain a second excluded file name pattern;
   wherein the second set of one or more log files stored at a second set of one or more file locations that match the second excluded file name pattern are removed from the first set of one or more log files stored at a first set of one or more file locations that match the second included file name pattern to identify a third set of one or more log files to be collected;
transmitting to or storing on the particular log collection target, information including the second included file name pattern and the second excluded file name pattern for collecting the third set of one or more log files.

8. The one or more media of claim 7, wherein the first included file name pattern is overridden on a per-target basis using a mapping table that maps an association to a target.

9. The one or more media of claim 7, wherein a target property is established having metadata to define the first variable portion of the first included file name pattern.

10. The one or more media of claim 7, wherein the first variable portion of the first included file name pattern is resolved based upon a specific host for a target.

11. The computer readable medium of claim 7, wherein a set of fixed selectable parameters is configured for the first variable portion of the first included file name pattern.

12. The one or more media of claim 7, wherein a rule defines a set of sources for the particular log collection target, along with conditions and actions to be triggered during monitoring of the particular log collection target.

13. A system, comprising:
at least one device including a hardware processor;
the system being configured to perform operations comprising:
storing a log collection configuration associated with a plurality of log collection targets, the log collection configuration comprising:
   a first included file name pattern, comprising (a) a first fixed portion and (b) a first variable portion, corresponding to a first set of one or more log files to include in log collection;
   a first excluded file name pattern, comprising (a) a second fixed portion and (c) a second variable portion, corresponding to a second set of one or more log files to exclude from the log collection;
based at least on the log collection configuration:
   replacing the first variable portion, in the first included file name pattern, with a first value associated with a particular log collection target in the plurality of log collection targets, to obtain a second included file name pattern;
   replacing the second variable portion, in the first excluded file name pattern, with a second value associated with the particular log collection target, to obtain a second excluded file name pattern;
   wherein the second set of one or more log files stored at a second set of one or more file locations that match the second excluded file name pattern are removed from the first set of one or more log files stored at a first set of one or more file locations that match the second included file name pattern to identify a third set of one or more log files to be collected;

transmitting to or storing on the particular log collection target, information including the second included file name pattern and the second excluded file name pattern for collecting the third set of one or more log files.

14. The system of claim 13, wherein the first included file name pattern is overridden on a per-target basis using a mapping table that maps an association to a target.

15. The system of claim 13, wherein a target property is established having metadata to define the first variable portion of the first included file name pattern.

16. The system of claim 13, wherein the first variable portion of the first included file name pattern is resolved based upon a specific host for a target.

17. The system of claim 13, wherein a set of fixed selectable parameters is configured for the first variable portion of the first included file name pattern.

18. The system of claim 13, wherein a rule defines a set of sources for the particular log collection target, along with conditions and actions to be triggered during monitoring of the particular log collection target.

19. The method of claim 1, wherein:
the log collection configuration is associated with a target type;
replacing the first variable portion of the pathname with the first value associated with the particular log collection target and replacing the second variable portion with the second value associated with the particular log collection target are responsive at least to determining that the target is associated with the same target type.

20. The method of claim 1, wherein:
replacing the first variable portion of the pathname with the first value associated with the particular log collection target and replacing the second variable portion with the second value associated with the particular log collection target are responsive at least to detecting an installation of an agent configured to perform the log collection for the target.

21. The method of claim 1, wherein the second included file name pattern is a complete pathname.

* * * * *

UNITED STATES PATENT AND TRADEMARK OFFICE
CERTIFICATE OF CORRECTION

| | | |
|---|---|---|
| PATENT NO. | : 10,585,908 B2 | Page 1 of 1 |
| APPLICATION NO. | : 15/089005 | |
| DATED | : March 10, 2020 | |
| INVENTOR(S) | : Russell | |

It is certified that error appears in the above-identified patent and that said Letters Patent is hereby corrected as shown below:

On the Title Page

On page 2, Column 2, under Other Publications, Line 47, delete "(Year:200)." and insert -- (Year:2000). --, therefor.

In the Specification

In Column 4, Line 50, delete "that that" and insert -- that --, therefor.

In Column 9, Line 67, delete "that that" and insert -- that --, therefor.

In Column 11, Line 38, delete "that that" and insert -- that --, therefor.

In Column 13, Line 64, delete "XML," and insert -- XML --, therefor.

In Column 14, Line 15, delete "XML," and insert -- XML --, therefor.

In Column 14, Line 16, delete "XML," and insert -- XML --, therefor.

In Column 14, Line 63, delete "Re-syncshronization" and insert -- Re-synchronization --, therefor.

In Column 18, Line 17, delete "scoring" and insert -- scoring. --, therefor.

In Column 25, Lines 17-18, delete " $(A-Z\{1\}[a-z]\{2\})\backslash s([0-9]\{1,2\})\backslash s([0-9]\{1,2\}):([0-9]\{2\}):([0-9]\{2\})$ " and insert -- $([A-Z]\{1\}[a-z]\{2\})\backslash s([0-9]\{1,2\})\backslash s([0-9]\{1,2\}):([0-9]\{2\}):([0-9]\{2\})$ --, therefor.

Signed and Sealed this
Third Day of November, 2020

Andrei Iancu
*Director of the United States Patent and Trademark Office*